(12) United States Patent
Lin

(10) Patent No.: US 12,224,820 B2
(45) Date of Patent: Feb. 11, 2025

(54) LEARNING-BASED DYNAMIC SIGNAL FORMATTING WITH RAMIFICATION CODING

(71) Applicant: QUALCOMM Incorporated, San Diego, CA (US)

(72) Inventor: Jamie Menjay Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/824,890

(22) Filed: May 25, 2022

(65) Prior Publication Data

US 2023/0387971 A1    Nov. 30, 2023

(51) Int. Cl.
    *H04B 7/0456*     (2017.01)
    *H04B 7/0452*     (2017.01)
    *H04W 72/1263*    (2023.01)
    *H04W 72/12*      (2023.01)

(52) U.S. Cl.
    CPC ......... *H04B 7/0456* (2013.01); *H04B 7/0452* (2013.01); *H04W 72/1263* (2013.01)

(58) Field of Classification Search
    None
    See application file for complete search history.

(56) References Cited

U.S. PATENT DOCUMENTS

| | | | | |
|---|---|---|---|---|
| 11,039,425 B2 * | 6/2021 | Lin | ................ | H04L 5/001 |
| 2018/0331693 A1 * | 11/2018 | Lou | ............... | H03M 13/15 |
| 2018/0376468 A1 * | 12/2018 | Lin | ................ | H04L 1/0064 |
| 2019/0394772 A1 * | 12/2019 | Li | ................. | H04W 72/23 |
| 2021/0352631 A1 * | 11/2021 | Fan | ............... | H04B 7/0626 |
| 2023/0189317 A1 * | 6/2023 | Narasimha Swamy | ............... | G06N 3/044 |
| | | | | 370/329 |

FOREIGN PATENT DOCUMENTS

WO    WO-2018082015 A1    5/2018

OTHER PUBLICATIONS

International Search Report and Written Opinion—PCT/US2023/065104—ISA/EPO—Jul. 4, 2023).

\* cited by examiner

*Primary Examiner* — Eunsook Choi
(74) *Attorney, Agent, or Firm* — Holland & Hart LLP/Qualcomm Incorporated

(57) ABSTRACT

Methods, systems, and devices for wireless communications are described. A transmitter may transmit control signaling indicating a common resource commonly allocated to a set of receivers, a dedicated resource allocated to a first receiver, and a ramification coding structure that indicates a common code segment and a dedicated code segment of a ramification codeword. The transmitter may determine the ramification coding structure based on common data for multiple receivers, a quantity of hierarchical levels, a machine learning model, or any combination thereof. The transmitter may encode common and dedicated data into at least one ramification codeword in a dynamic signaling format using the ramification coding structure, and transmit the at least one ramification codeword to the first receiver via the common and dedicated resources. Being aware of the ramification coding structure, the first receiver may decode the ramification codeword transmitted by the transmitter in the dynamic signaling format.

30 Claims, 20 Drawing Sheets

LEARNING-BASED DYNAMIC SIGNAL FORMATTING WITH RAMIFICATION CODING

FIELD OF TECHNOLOGY

The following relates to wireless communications, including learning-based dynamic signal formatting with ramification coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, wireless devices (e.g., UEs, base stations) may communicate control signaling that has a fixed format. In addition, the control signaling may include information specific to a particular receiver. Using a fixed control signaling format to transmit information that is common to a large quantity of receivers may be inefficient.

SUMMARY

The described techniques relate to improved methods, systems, devices, and apparatuses that support learning-based dynamic signal formatting with ramification coding. Generally, the described techniques provide for learning-based dynamic signal formatting for ramification coding. A wireless device (e.g., a user equipment (UE), a base station) may use ramification coding to encode common bits and dedicated bits into a single ramification codeword, which may efficiently encode common information for a large quantity of receivers and provide efficient resource allocation, for example in dense UE environments (e.g., sporting event stadiums). In some examples, a transmitter (e.g., a base station) may determine a ramification coding structure that may indicate a common code segment and a dedicated code segment of a ramification codeword. For example, the transmitter may determine the ramification coding structure based on common data that is scheduled to be transmitted to multiple receivers, a quantity of hierarchical levels, a machine learning model, or any combination thereof.

The transmitter may transmit control signaling that indicates common resource, a dedicated resource, and the ramification coding structure. In some cases, the common resource may be commonly allocated to the multiple receivers, and the dedicated resource may be allocated to a first receiver included in the multiple receivers. The transmitter may encode common data and dedicated data into at least one ramification codeword in a dynamic signaling format. For example, the transmitter may encode the at least one ramification codeword based on allocating some bits (e.g., common data) to the common code segment and some other bits (e.g., dedicated data) to the dedicated code segment. In some cases, the transmitter may transmit the at least one ramification codeword in the dynamic signaling format to the first receiver using the common resource and dedicated resource, and the first receiver may decode the ramification codeword based on the ramification coding structure. As such, the transmitter may transmit the common data to multiple receivers using the same common resource, and dedicated data to respective individual receivers using corresponding dedicated resources via the same ramification codeword.

A method for wireless communication at a first transmitter is described. The method may include transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, encoding the common data and dedicated data of the first receiver into at least one ramification codeword in a dynamic signaling format based on the ramification coding structure, and transmitting the at least one ramification codeword in the dynamic signaling format via the common resource and the dedicated resource.

An apparatus for wireless communication at a first transmitter is described. The apparatus may include a processor, memory coupled with the processor, and instructions stored in the memory. The instructions may be executable by the processor to cause the apparatus to transmit control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, encode the common data and dedicated data of the first receiver into at least one ramification codeword in a dynamic signaling format based on the ramification coding structure, and transmit the at least one ramification codeword in the dynamic signaling format via the common resource and the dedicated resource.

Another apparatus for wireless communication at a first transmitter is described. The apparatus may include means for transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, means for encoding the common data and dedicated data of the first receiver into at least one ramification codeword in a dynamic signaling format based on the ramification coding structure, and means for transmitting the at least one ramification codeword in the dynamic signaling format via the common resource and the dedicated resource.

A non-transitory computer-readable medium storing code for wireless communication at a first transmitter is described. The code may include instructions executable by a processor to transmit control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, encode the common data and dedicated data of the first receiver into at least one ramification codeword in a dynamic signaling format based on the ramification coding structure, and transmit the at least one ramification codeword in the dynamic signaling format via the common resource and the dedicated resource.

In some examples of the method, apparatuses, and non-transitory computer-readable medium described herein, the ramification coding structure for the set of multiple messages may be based on a quantity of hierarchical levels.

Some examples of the method, apparatuses, and non-transitory computer-readable medium described herein may further include operations, features, means, or instructions for applying, for the quantity of hierarchical levels, a machine learning model to identify the common data in the set of multiple messages.

In some examples of the method, apparatuses, and non-transitory computer-readable medium described herein, applying the machine learning model may include operations, features, means, or instructions for applying, using a set of one or more parameters, the machine learning model to allocate a first set of bits of the ramification codeword to the common code segment and a second set of bits of the ramification codeword to the dedicated code segment and where the set of one or more parameters includes at least one of an aggregated user activity parameter associated with the set of multiple receivers, a user signal format parameter associated with the set of multiple receivers, or a cell loading parameter associated with the set of multiple receivers.

In some examples of the method, apparatuses, and non-transitory computer-readable medium described herein, the machine learning model includes a graph neural network (GNN) model.

Some examples of the method, apparatuses, and non-transitory computer-readable medium described herein may further include operations, features, means, or instructions for allocating, based on the ramification coding structure, a first set of bits of the ramification codeword to the common code segment and a second set of bits of the ramification codeword to the dedicated code segment, where encoding the ramification codeword may be based on the allocating.

In some examples of the method, apparatuses, and non-transitory computer-readable medium described herein, the ramification coding structure indicates a quantity of bits to be used for the common code segment of the ramification codeword based on the common data in the set of multiple messages.

In some examples of the method, apparatuses, and non-transitory computer-readable medium described herein, the control signaling indicates an ending of the common code segment of the ramification codeword and a beginning of the dedicated code segment of the ramification codeword.

In some examples of the method, apparatuses, and non-transitory computer-readable medium described herein, the control signaling indicates a dynamic schedule based on a duration of the dynamic signaling format, a periodicity of the dynamic signaling format, or both.

In some examples of the method, apparatuses, and non-transitory computer-readable medium described herein, the dynamic schedule may be periodic, semi-persistent, or persistent.

In some examples of the method, apparatuses, and non-transitory computer-readable medium described herein, the control signaling indicates the ramification codeword may be encoded using a first ramification coding type of a set of multiple types of ramification coding, where the ramification codeword may be decoded based on the first ramification coding type.

In some examples of the method, apparatuses, and non-transitory computer-readable medium described herein, the first ramification coding type indicates that a beginning subset or an ending subset of bits of the ramification codeword may be the common code segment.

In some examples of the method, apparatuses, and non-transitory computer-readable medium described herein, the first ramification coding type indicates that the ramification codeword may be encoded using convolution coding or polar coding.

In some examples of the method, apparatuses, and non-transitory computer-readable medium described herein, the control signaling schedules a transmission of a message in the common resource and the dedicated resource.

In some examples of the method, apparatuses, and non-transitory computer-readable medium described herein, the control signaling indicates the ramification codeword concatenates the common code segment and the dedicated code segment.

In some examples of the method, apparatuses, and non-transitory computer-readable medium described herein, the control signaling indicates an interleaving pattern applied to interleave the common code segment and the dedicated code segment to generate the ramification codeword.

In some examples of the method, apparatuses, and non-transitory computer-readable medium described herein, the ramification codeword includes a control message codeword or a data message codeword.

A method for wireless communication at a first receiver is described. The method may include receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, receiving, based on the control signaling, at least one ramification codeword in a dynamic signaling format via the common resource and the dedicated resource that is allocated to the first receiver, and decoding the at least one ramification codeword in the dynamic signaling format to obtain the common code segment and a first dedicated code segment for the first receiver based on the ramification coding structure.

An apparatus for wireless communication at a first receiver is described. The apparatus may include a processor, memory coupled with the processor, and instructions stored in the memory. The instructions may be executable by the processor to cause the apparatus to receive control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, receive, based on the control signaling, at least one ramification codeword in a dynamic signaling format via the common resource and the dedicated resource that is allocated to the first receiver, and decode the at least one ramification codeword in the dynamic signaling format to obtain the common code segment and a first dedicated code segment for the first receiver based on the ramification coding structure.

Another apparatus for wireless communication at a first receiver is described. The apparatus may include means for receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, means for receiving, based on the control signaling, at least one ramification codeword in a dynamic signaling format via the common resource and the dedicated resource that is allocated to the first receiver, and means for decoding the at least one ramification codeword in the dynamic signaling format to obtain the common code segment and a first dedicated code segment for the first receiver based on the ramification coding structure.

A non-transitory computer-readable medium storing code for wireless communication at a first receiver is described. The code may include instructions executable by a processor to receive control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers, receive, based on the control signaling, at least one ramification codeword in a dynamic signaling format via the common resource and the dedicated resource that is allocated to the first receiver, and decode the at least one ramification codeword in the dynamic signaling format to obtain the common code segment and a first dedicated code segment for the first receiver based on the ramification coding structure.

In some examples of the method, apparatuses, and non-transitory computer-readable medium described herein, the control signaling indicates an ending of the common code segment of the ramification codeword and a beginning of the dedicated code segment of the ramification codeword.

In some examples of the method, apparatuses, and non-transitory computer-readable medium described herein, the control signaling indicates a dynamic schedule based on a duration of the dynamic signaling format, a periodicity of the dynamic signaling format, or both.

In some examples of the method, apparatuses, and non-transitory computer-readable medium described herein, the dynamic schedule may be periodic, semi-persistent, or persistent.

In some examples of the method, apparatuses, and non-transitory computer-readable medium described herein, the control signaling indicates the ramification codeword may be encoded using a first ramification coding type of a set of multiple types of ramification coding, where the ramification codeword may be decoded based on the first ramification coding type.

In some examples of the method, apparatuses, and non-transitory computer-readable medium described herein, the first ramification coding type indicates that a beginning subset or an ending subset of bits of the ramification codeword may be the common code segment.

In some examples of the method, apparatuses, and non-transitory computer-readable medium described herein, the first ramification coding type indicates that the ramification codeword may be encoded using convolution coding or polar coding.

In some examples of the method, apparatuses, and non-transitory computer-readable medium described herein, the ramification coding structure for the set of multiple messages may be based on a quantity of hierarchical levels.

In some examples of the method, apparatuses, and non-transitory computer-readable medium described herein, the ramification coding structure indicates a quantity of bits of the ramification codeword being used for the common code segment based at least in part on the common data in the set of multiple messages.

In some examples of the method, apparatuses, and non-transitory computer-readable medium described herein, the ramification coding structure indicates a quantity of bits of the ramification codeword being used for the dedicated code segment.

In some examples of the method, apparatuses, and non-transitory computer-readable medium described herein, the control signaling schedules a transmission of a message in the common resource and the dedicated resource.

In some examples of the method, apparatuses, and non-transitory computer-readable medium described herein, the control signaling indicates the ramification codeword concatenates the common code segment and the dedicated code segment.

In some examples of the method, apparatuses, and non-transitory computer-readable medium described herein, the control signaling indicates an interleaving pattern applied to interleave the common code segment and the dedicated code segment to generate the ramification codeword.

In some examples of the method, apparatuses, and non-transitory computer-readable medium described herein, the ramification codeword includes a control message codeword or a data message codeword.

DETAILED DESCRIPTION

Figure 1:
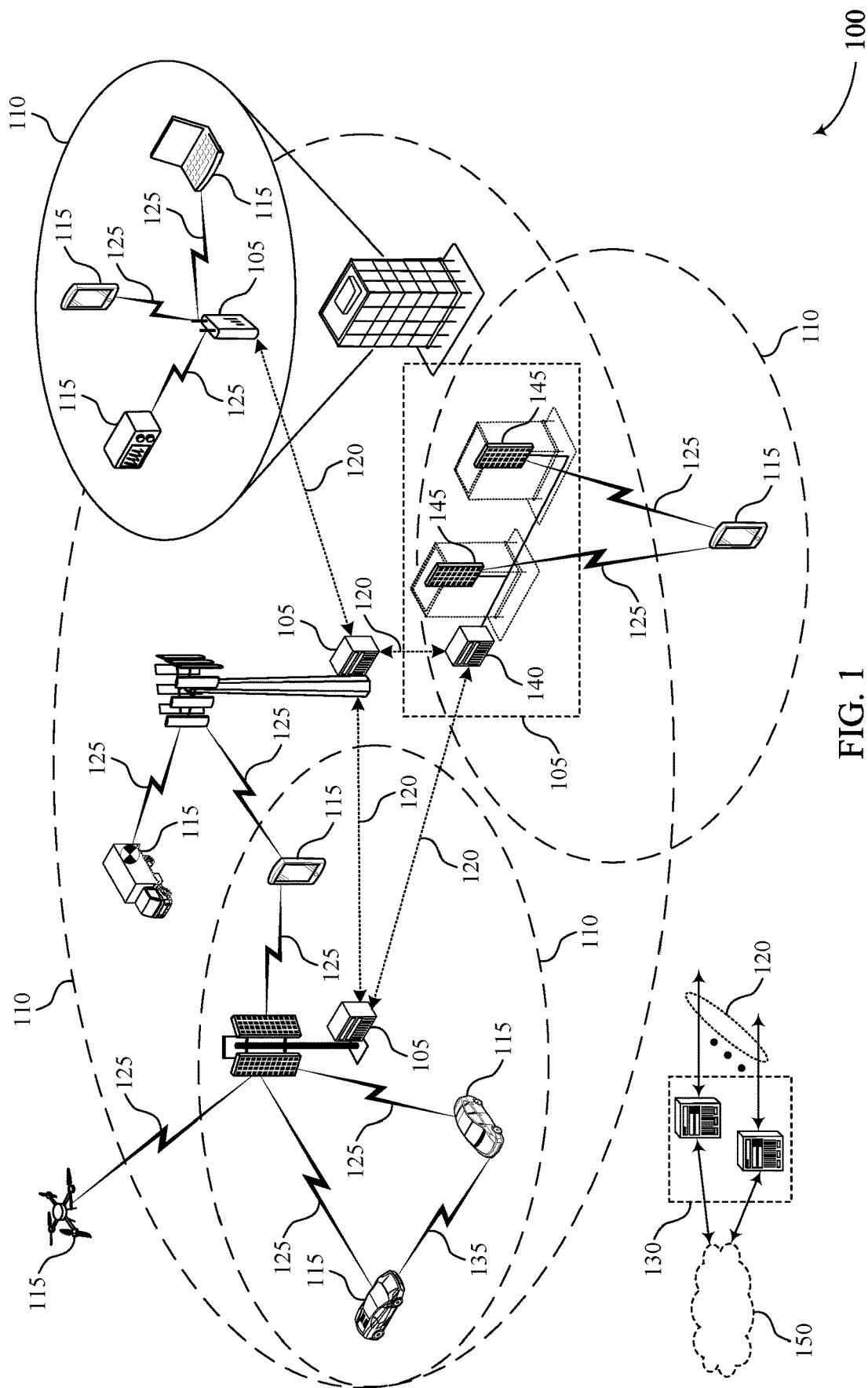
FIG. 1 illustrates an example of a wireless communications system that supports learning-based dynamic signal formatting with ramification coding in accordance with aspects of the present disclosure.

In some wireless communications systems, wireless devices (e.g., user equipments (UEs), base stations) may transmit and receive control signaling. In some examples, the format of the control signaling may be fixed. For example, the order and arrangement of bits in the control signaling may be restricted to a fixed format. Additionally, or alternatively, control signaling may be generated to include information that is specific to a particular receiver. Using a fixed control signaling format may be inefficient in cases when a transmitter attempts to send control information that is common to a large quantity of receivers. For example, sending control information that is common to a large set of receivers in separate control messages that are separately sent to each receiver may inefficiently use system resources. In addition, transmitting individual control messages may fail to utilize coding techniques that may take advantage of the fact that some bits of the control signaling are common to a large set of receivers.

Techniques described herein enable learning-based dynamic signal formatting for ramification coding. A wireless device (e.g., a UE, a base station) may use ramification coding to encode common bits and dedicated bits into a single ramification codeword, which may efficiently encode common information for a large quantity of receivers and provide efficient resource allocation, for example in dense UE environments (e.g., sporting event stadiums). In some examples, a transmitter (e.g., a base station) may determine a ramification coding structure that may indicate a common code segment and a dedicated code segment of a ramification codeword. For example, the transmitter may determine the ramification coding structure based on common data that is scheduled to be transmitted to multiple receivers, a quantity of hierarchical levels, a machine learning model, or any combination thereof.

The transmitter may transmit control signaling that indicates common resource, a dedicated resource, and the ramification coding structure. In some cases, the common resource may be commonly allocated to the multiple receivers, and the dedicated resource may be allocated to a first receiver included in the multiple receivers. The transmitter may encode common data and dedicated data into at least one ramification codeword in a dynamic signaling format. For example, the transmitter may encode the at least one ramification codeword based on allocating some bits (e.g., common data) to the common code segment and some other bits (e.g., dedicated data) to the dedicated code segment. In some cases, the transmitter may transmit the at least one ramification codeword in the dynamic signaling format to the first receiver using the common resource and dedicated resource, and the first receiver may decode the ramification codeword based on the ramification coding structure. As such, the transmitter may transmit the common data to multiple receivers using the same common resource, and dedicated data to respective individual receivers using corresponding dedicated resources via the same ramification codeword.

Particular aspects of the subject matter described in this disclosure may be implemented to realize one or more of the following potential advantages. The techniques employed by the described communication devices may provide benefits and enhancements to the operation of the communication devices, including increased resource utilization efficiency, improved communication reliability, and improved coordination between wireless devices. For example, operations performed by the described communication devices may provide improvements to resource utilization efficiency by enabling transmissions of common data via common resources. In some examples, the operations performed by the described communication devices to improve communication reliability include transmitting common data to multiple receivers and dedicated data to individual receivers, thereby preventing receivers from receiving data that is only relevant to that receiver. In some other examples, operations performed by the described communication devices may also support improvements to improved coordination between devices, spectral efficiency, and higher data rates, among other benefits.

Aspects of the disclosure are initially described in the context of wireless communications systems. Aspects of the disclosure are then described in the context of resource allocations, signaling formats, ramification coding structures, ramification coding schemes, polar coding schemes, and process flows. Aspects of the disclosure are further illustrated by and described with reference to apparatus diagrams, system diagrams, and flowcharts that relate to learning-based dynamic signal formatting with ramification coding.

FIG. 1 illustrates an example of a wireless communications system 100 that supports learning-based dynamic signal formatting with ramification coding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some examples in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some systems, wireless devices (e.g., UEs 115, base stations 105) may transmit and receive control signaling. In some examples, resources used for transmitting and receiving the control signaling may be limited (e.g., by encoding and decoding efficiencies, resource allocation efficiencies), and as such, may be shared by many wireless devices. In some examples, the format of the control signaling may be fixed. For example, the order and arrangement of bits in the control signaling may be restricted to a fixed format (e.g., field definitions may be static). Additionally, or alternatively, control signaling may be generated to include information that is specific to a particular receiver. Using a fixed control signaling format may be inefficient in cases when attempting to send control information that is common to a large quantity of receivers (e.g., 80,000 attendees of a sporting event, industrial or private networks with repetitive or similar signaling payloads). For example, sending control information that is common to a large set of receivers, in separate control messages that are separately sent to each receiver, may inefficiently use system resources. In addition, transmitting individual control messages may fail to utilize coding techniques that may be applied to take advantage of the fact that some bits of the control signaling are common to a large set of receivers.

In some examples, a transmitter may use ramification coding for control signaling under particular conditions. For example, an encoder may receive a quantity of input bits (e.g., source pre-encoding bits) $u_i$, where $i \in \{0, 1, \ldots, K-1\}$ (e.g., K input bits), and the encoder may encode the input bits $u_i$ to output encoded bits $e_j$, where $j \in \{0, 1, \ldots, N-1\}$ (e.g., N output bits). That is, redundancies may be added to the input bits in the encoding process to increase reliability and counteract channel impairments (e.g., channel fading, noise). In some examples (e.g., in polar coding), the quantity of input bits may be equal to the quantity of output bits (e.g., K=N).

In some cases, a subset of codes may satisfy a set of eligibility conditions in order to apply ramification coding. For example, the subset of codes may satisfy an eligibility condition that either $e_j=f_0(u_0, \ldots, u_{i-1}, u_i)$ or $e_j=f_1(u_i, u_{i+1}, \ldots, u_{K-1})$, $\forall j \in \{0, 1, \ldots, N-1\}$, where $i \in \{0, 1, \ldots, K-1\}$ and $f_0(.)$ and $f_1(.)$ may represent encoder functions. In addition, the subset of codes may satisfy an eligibility condition that for i and j, $i=g_c(j)$, where $i \in \{0, 1, \ldots, K-1\}$, $j \in \{0, 1, \ldots, N-1\}$, and $g_c(.)$ may represent a function depending on the particular code. For example, for convolutional codes of a code rate R, $i=g_0(j)=\lfloor jR \rfloor$, and $f_0(.)$ may be used. For polar codes, $i=g_1(j)=j$, and $f_1(.)$ may be used. In some examples, the subset of codes may satisfy an eligibility condition that for $i_0$, $i_1$, $j_0$, and $j_1$ in their respective defined range values, if $(i_1 > i_0)$, then $(j_1 > j_0)$. A code that satisfies such eligibility conditions may apply ramification coding.

The wireless communications system 100 may support learning-based dynamic signal formatting for ramification coding. A wireless device (e.g., a UE 115, a base station 105) may use ramification coding to encode common bits and dedicated bits into a single ramification codeword, which may efficiently encode common information for a large quantity of receivers and provide efficient resource allocation, for example in dense UE environments (e.g., sporting event stadiums). In some examples, a transmitter (e.g., a base station) may determine a ramification coding structure that may indicate a common code segment and a dedicated code segment of a ramification codeword. For example, the transmitter may determine the ramification coding structure based on common data that is scheduled to be transmitted to multiple receivers, a quantity of hierarchical levels, a machine learning model, or any combination thereof.

The transmitter may transmit control signaling that indicates common resource, a dedicated resource, and the ramification coding structure. In some cases, the common resource may be commonly allocated to the multiple receivers, and the dedicated resource may be allocated to a first receiver included in the multiple receivers. The transmitter may encode common data and dedicated data into at least one ramification codeword in a dynamic signaling format.

For example, the transmitter may encode the at least one ramification codeword based on allocating some bits (e.g., common data) to the common code segment and some other bits (e.g., dedicated data) to the dedicated code segment. In some cases, the transmitter may transmit the at least one ramification codeword in the dynamic signaling format to the first receiver using the common resource and dedicated resource, and the first receiver may decode the ramification codeword based on the ramification coding structure. As such, the transmitter may transmit the common data to multiple receivers using the same common resource, and dedicated data to respective individual receivers using corresponding dedicated resources via the same ramification codeword.

Figure 2:
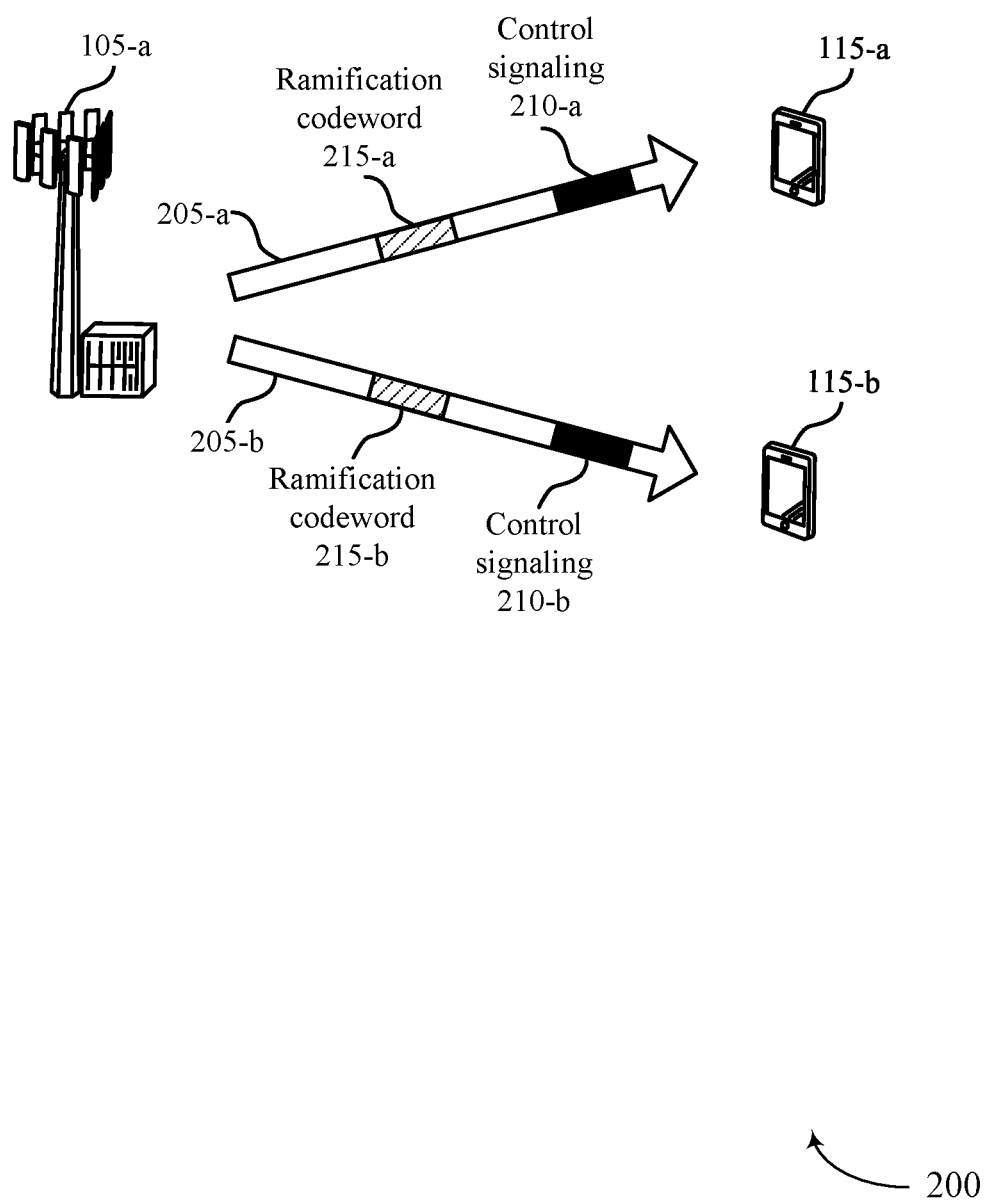
FIG. 2 illustrates an example of a wireless communications system that supports learning-based dynamic signal formatting with ramification coding in accordance with aspects of the present disclosure.

FIG. 2 illustrates an example of a wireless communications system 200 that supports learning-based dynamic signal formatting with ramification coding in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a UE 115-b, and a base station 105-a, which may be examples of corresponding devices described herein.

In some examples, the base station 105-a may communicate with multiple UEs 115, such as the UE 115-a and the UE 115-b (e.g., in an MU-MIMO communications system). For example, the base station 105-a may communicate with the UE 115-a via a communications link 205-a and the UE 115-b via a communications link 205-b. In some examples, the base station 105-a may be a transmitter or a receiver, and each UE 115 may be a transmitter or a receiver.

The wireless communications system 200 may support learning-based dynamic signal formatting for ramification coding. In some examples, the base station 105-a may identify control information that is common to a large quantity of UEs 115 (e.g., control signaling for 80,000 attendees of a sporting event, control signaling for industrial or private networks with repetitive or similar signaling payloads). To efficiently encode the common information, generate dynamic signal formats, and allocate resources to many UEs 115 in dense UE environments, the base station 105-a (e.g., or another transmitter) may use ramification coding to encode common bits and dedicated bits into a single ramification codeword. As such, the base station 105-a may use a ramification coding structure to optimize formatting of signaling payloads to the many UEs 115 (e.g., based on loading, activity types, and other analytics) and reduce encoding complexity.

In some examples, a ramification coding structure may indicate a common code segment and a dedicated code segment of a ramification codeword. For example, the common code segment may be allocated common bits shared between many UEs 115 (e.g., including the UE 115-a and the UE 115-b) and the dedicated code segment may be allocated dedicated bits unique to the UE 115-a or the UE 115-b. In some cases, the ramification coding structure may be based on common data in a plurality of messages scheduled to be transmitted to the UEs 115. That is, the base station 105-a may identify data that is common to a large quantity of UEs 115 and use the common data to determine how much of the ramification coding structure to allocate to common data and dedicated data. Additionally, or alternatively, the ramification coding may support a hierarchical structure of signal contents, which may enable the base station 105-a to identify a quantity of bits that may be allocated to the common code segment of the ramification codeword and a quantity of bits that may be allocated to the dedicated code segment of the ramification codeword. For example, the ramification coding structure may be based on a quantity of hierarchical levels, where each level may be associated with common data or dedicated data.

In some cases, the base station 105-a may support the hierarchical structure of the ramification coding through machine (e.g., continual, online) learning using a graph neural network (GNN). For example, upon identifying an opportunity in which to apply ramification coding (e.g., upon identifying control data that is common to multiple UEs 115), the base station 105-a may perform the machine learning using the GNN and determine which fields in a ramification codeword may be shared by multiple UEs 115 and which fields may be unique for individual UEs 115. For example, the base station 105-a may identify that a large quantity of UEs 115 share common data. The base station 105-a may use machine learning to allocate the common data to a common portion of a ramification codeword that is shared among the multiple UEs 115 (e.g., the common code segment) and dedicated data to a dedicated portion of the ramification codeword that is unique to a particular UE 115.

In some examples, the base station 105-a may transmit control signaling 210-a to the UE 115-a and control signaling 210-b to the UE 115-b. The control signaling 210-a may indicate a common resource that is commonly allocated to multiple UEs 115 (e.g., including the UE 115-a), a dedicated resource that is allocated to the UE 115-a, and the ramification coding structure. The control signaling 210-b may indicate the common resource that is commonly allocated to multiple UEs 115 (e.g., including the UE 115-b), a dedicated resource that is allocated to the UE 115-b, and the ramification codeword. In some examples, the base station 105-a may use the common resource and the dedicated resources to transmit the common code segment of the ramification codeword and the dedicated code segments of the ramification codeword, respectively. Using a common code segment in this way may improve resource utilization and increase signaling reliability.

The base station 105-a may use the ramification coding structure to encode the common data and dedicated data for each UE 115 into at least one ramification codeword in a dynamic signaling format. For example, the base station 105-a may encode the common data and dedicated data for the UE 115-a into a ramification codeword 215-a and the base station 105-a may encode the common data and different dedicated data for the UE 115-b into a ramification codeword 215-b. That is, the ramification codeword 215-a and the ramification codeword 215-b may have a same common code segment for the common data and different dedicated code segments for the dedicated data that is unique to each UE 115. Put another way, the dynamic signaling format may indicate how the ramification codeword is transmitted via the common resource and the dedicated resource.

In some cases, the base station 105-a may transmit the ramification codeword 215-a to the UE 115-a via a common resource and a first dedicated resource. Additionally, or alternatively, the base station 105-a may transmit the ramification codeword 215-b to the UE 115-b via the common resource and a second dedicated resource. As such, the UE 115-a and the UE 115-b may share the common resource and each have a unique dedicated resource. In some examples, the UE 115-a may decode the ramification codeword 215-a to obtain the common code segment and the first dedicated code segment, and the UE 115-b may decode the ramification codeword 215-*b* to obtain the common code segment and the second dedicated code segment. The UE 115-*a* and the UE 115-*b* may be able to successfully decode the respective ramification codewords 215 based on the ramification coding structure (e.g., indicated in the control signaling 210). That is, with knowledge of how the common code segment and the dedicated code segment are allocated in the ramification codewords 215, the UEs 115 may each obtain the shared, common code segment and the UEs 115 may individually obtain the dedicated code segment that corresponds to just that UE 115.

In an example, the base station 105-*a*, the UE 115-*a*, and the UE 115-*b* may be in a MU-MIMO communications system, in which the base station 105-*a* may perform beamforming in a particular direction. In MU-MIMO systems, multiple UEs 115 may share similar aspects of a signaling payload. By applying learning-based dynamic signal formatting to MU-MIMO communications systems, the base station 105-*a* may utilize resources shared by multiple UEs 115, improving resource utilization as the base station 105-*a* may refrain from beamforming to each individual UE 115. Additionally, or alternatively, the described techniques may reduce interference between users in MU-MIMO as limiting the quantity of beams to different UEs 115 may reduce leakage from other UEs 115.

Figure 3:
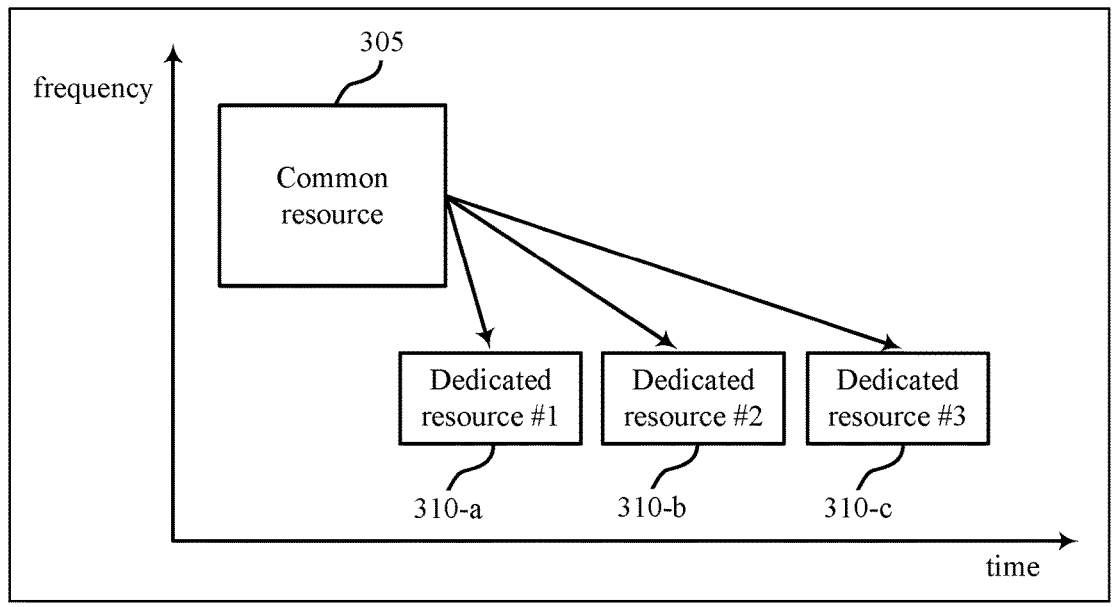
FIG. 3 illustrates examples of a resource allocation and a signaling format that support learning-based dynamic signal formatting with ramification coding in accordance with aspects of the present disclosure.
Figure 3:
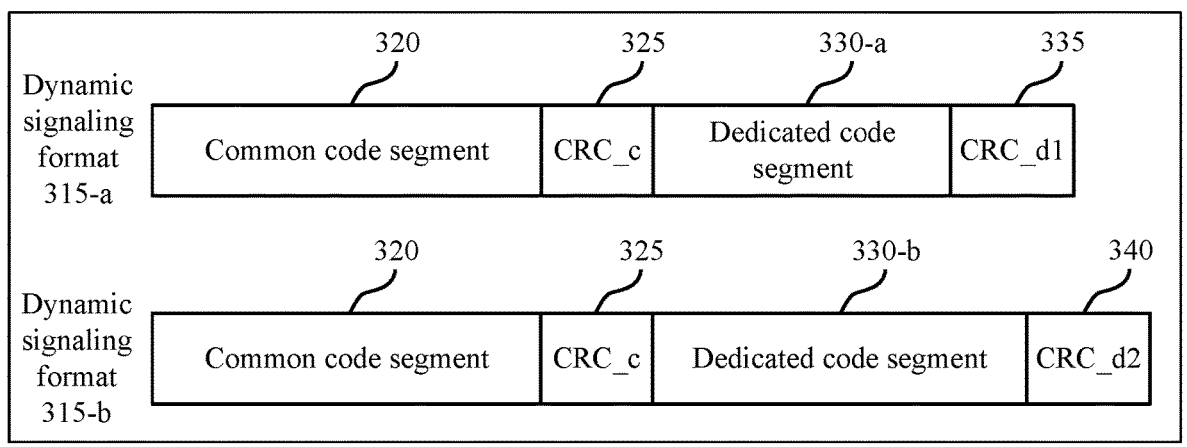

FIG. 3 illustrates an example of a resource allocation 300 and a signaling format 301 that supports learning-based dynamic signal formatting with ramification coding in accordance with aspects of the present disclosure. In some examples, a transmitter (e.g., a base station or a UE) may implement the resource allocation 300 and the signaling format 301 to encode common information for a large quantity of receivers (e.g., UEs or base stations) and improve resource allocation efficiency.

As described herein, a transmitter may use ramification coding to encode common bits and dedicated bits into a single ramification codeword in dense UE environments (e.g., sporting event stadiums, office complexes). In some examples, the ramification coding may be based on a ramification coding structure, which may support a hierarchical structure of signal contents. The ramification coding structure may indicate a common code segment 320 (e.g., which may be allocated common data for multiple receivers) and a dedicated code segment 330 (e.g., which may be allocated dedicated data for one receiver) of a ramification codeword.

The transmitter may communicate with multiple receivers in a wireless communications system (e.g., an MU-MIMO communications system) using different time and frequency resources. In some examples, the transmitter may transmit control signaling that indicates a common resource 305, a dedicated resource 310-*a* (e.g., a dedicated resource #1), and the ramification coding structure to a first receiver (e.g., a UE 1). Additionally, or alternatively, the transmitter may transmit control signaling that indicates the common resource 305, a dedicated resource 310-*b* (e.g., a dedicated resource #2), and the ramification coding structure to a second receiver (e.g., a UE 2), and the transmitter may transmit control signaling that indicates the common resource 305, a dedicated resource 310-*c* (e.g., a dedicated resource #3), and the ramification coding structure to a third receiver (e.g., a UE 3). Upon transmitting the control signaling, the transmitter may transmit common data, dedicated data, or both to each receiver using the common resource 305, which is shared among the receivers, and using a dedicated resource 310, which is unique to each receiver.

In some examples, the transmitter may use the resource allocation 300 (e.g., the common resource 305 and the dedicated resources 310) to transmit at least one ramification codeword to a receiver, where the ramification codeword may be encoded based on the ramification coding structure and transmitted according to the signaling format 301. The signaling format 301 may include a dynamic signaling format 315-*a* that may correspond to a first receiver (e.g., the UE 1), and a dynamic signaling format 315-*b* that may correspond to a second receiver (e.g., the UE 2). The dynamic signaling format 315-*a* may include a common code segment 320 and a dedicated code segment 330-*a*, and the dynamic signaling format 315-*b* may include the common code segment 320 (e.g., the dynamic signaling formats 315 may share the common code segment 320, which may be the same for the dynamic signaling format 315-*a* and the dynamic signaling format 315-*b*) and a dedicated code segment 330-*b*.

In some examples, the transmitter may encode common data (e.g., data shared by the UE 1 and the UE 2) and dedicated data (e.g., data dedicated to the UE 1 or the UE 2) into a ramification codeword using the dynamic signaling format 315-*a* or the dynamic signaling format 315-*b*, depending on whether the dedicated data corresponds to the first receiver or the second receiver. Based on the ramification coding structure, the transmitter may allocate a first set of bits of the ramification codeword to a common code segment 320 and a second set of bits of the ramification codeword to a dedicated code segment 330 to encode the ramification codeword. For example, the transmitter may identify a total quantity of information bits to be transmitted to the receivers (e.g., 50 bits). The transmitter may identify that a set of the bits are common among the first receiver and the second receiver (e.g., 20 bits shared by the receivers), and subsequently, that the remaining bits may be dedicated to the first receiver or the second receiver (e.g., 30 bits allocated to individual receivers). The ramification coding structure may indicate this division of common and dedicated bits and enable the transmitter to allocate the common bits to the common code segment 320 and the dedicated bits to a dedicated code segment 330.

In some examples, instead of configuring a unique ramification codeword and corresponding static signaling format for each receiver, the transmitter may identify common portions of signaling that may be shared among the multiple receivers, and reuse those common portions (e.g., over frequency and time) to improve resource efficiency and reduce interference between the receivers. For example, in a controlled environment (e.g., a private network) in which signals may be repeated often, the transmitter may reuse the common resource 305 over frequency and time without the receivers re-decoding the ramification codeword for the common code segment 320 each time the common resource 305 is reused.

After encoding at least one ramification codeword, the transmitter may transmit the at least one ramification codeword to a corresponding receiver in a dynamic signaling format 315 and using the common resource 305 and a dedicated resource 310. For example, the transmitter may encode a first ramification codeword for the first receiver that includes the common code segment 320 and a dedicated code segment 330-*a*. The transmitter may transmit the first ramification codeword to the first receiver in the dynamic signaling format 315-*a* such that the transmitter transmits the common code segment 320 using the common resource 305 and the dedicated code segment 330-*a* using the dedicated resource 310-*a* (e.g., dedicated resource #1). In some examples, the dynamic signaling format 315-a may include a cyclic redundancy check (CRC) 325 (e.g., CRC_c) after the common code segment 320 and a CRC 335 (e.g., CRC_d1) after the dedicated code segment 330-a.

Additionally, or alternatively, the transmitter may encode a second ramification codeword for the second receiver that includes the common code segment 320 (e.g., the same common code segment as in the first ramification codeword) and a dedicated code segment 330-b. The transmitter may transmit the second ramification codeword to the second receiver in the dynamic signaling format 315-b such that the transmitter may transmit the common code segment 320 using the common resource 305 and the dedicated code segment 330-b using the dedicated resource 310-b (e.g., dedicated resource #2). In some examples, the dynamic signaling format 315-b may include a CRC 325 (e.g., CRC_c) after the common code segment 320 and a CRC 340 (e.g., CRC_d2) after the dedicated code segment 330-b.

As the common code segment 320 may be the same across the dynamic signaling format 315-a and the dynamic signaling format 315-b, the first receiver and the second receiver may share the common code segment 320. In other words, the common code segment 320 may occupy a single instance of resources or resource elements (e.g., the common resource), and the transmitter may bundle fields that are common among similar users such that the similar users (e.g., the first receiver and the second receiver) may share the common code segment 320 and the common resource 305. In addition, the CRC 325 (e.g., associated with the common code segment 320) may be the same in the dynamic signaling format 315-a and the dynamic signaling format 315-b because the payload in the common code segment 320 is the same.

In some examples, the first receiver and the second receiver may monitor the common resource 305 and the dedicated resources 310 to obtain a corresponding ramification codeword. Upon receiving the common resource 305 and the dedicated resources 310, the first receiver and the second receiver may decode the corresponding ramification codeword to obtain the common code segment 320 (e.g., that is shared by the first receiver and the second receiver) and a corresponding dedicated code segment 330 based on the ramification coding structure. Because the ramification coding structure (e.g., indicated to the receivers in control signaling by the transmitter) indicates the division of common bits and dedicated bits in the ramification codewords, the receivers may be aware of how many common bits to decode from the common code segment 320 before they decode the dedicated bits in their respective dedicated code segment 330. Additionally, or alternatively, the receivers may refrain from re-decoding the ramification codeword for the common code segment 320 if the transmitter reuses the common code segment 320 and the common resource 305 (e.g., in a repetitive or similar payload scenario, such as a factory where there may be automation in an assembly line, or in a private network). In addition, using the common code segment 320 and the dedicated code segments 330 in this way may increase resource utilization efficiency and improve signaling reliability and quality.

In some examples, the transmitter may transmit the ramification codewords in a dynamic signaling format 315 and using a dynamic schedule. For example, the transmitter may transmit control signaling to the receivers that indicates a dynamic schedule based on a duration of the dynamic signaling formats 315, a periodicity of the dynamic signaling formats 315, or any combination thereof. In some examples, the dynamic schedule may be periodic, semi-persistent or persistent. For example, the transmitter may use the dynamic schedule to transmit the ramification codewords according to a periodicity and in a dynamic signaling format 315.

Figure 4:
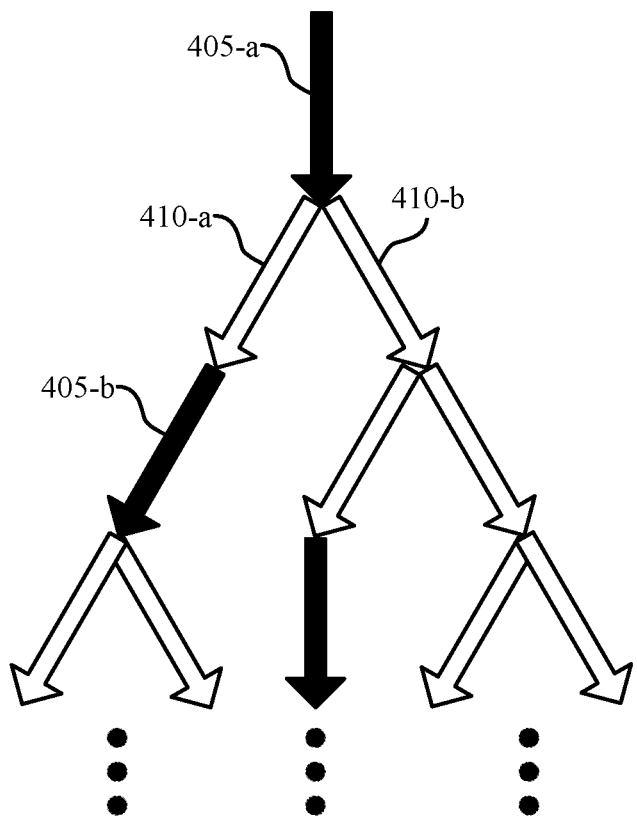
FIG. 4 illustrates an example of a ramification coding structure that supports learning-based dynamic signal formatting with ramification coding in accordance with aspects of the present disclosure.
Figure 4:
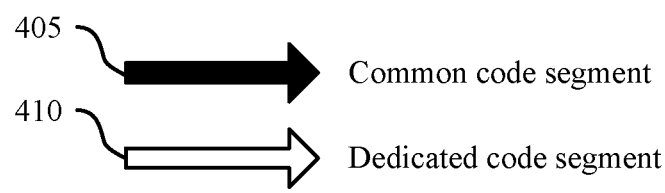

FIG. 4 illustrates an example of a ramification coding structure 400 that supports learning-based dynamic signal formatting with ramification coding in accordance with aspects of the present disclosure. In some examples, a transmitter may encode a ramification codeword based on the ramification coding structure 400, such that the ramification codeword may include common code segments 405 for transmitting common data shared by multiple receivers and dedicated code segments 410 (e.g., ramified code segments) for transmitting dedicated data to individual receivers.

As described herein, the transmitter (e.g., a base station, a UE) may encode a ramification codeword using the ramification coding structure 400, which may indicate the common code segments 405 and the dedicated code segments 410 of a ramification codeword. In some examples, the ramification coding structure 400 may be based on common data in a set of messages scheduled to be transmitted to multiple receivers (e.g., UEs, base stations). That is, the transmitter may identify common data between multiple receivers to allocate to a common code segment 405, and as such, the remaining portion of the ramification codeword may include a dedicated code segment 410.

In some cases, the ramification coding structure 400 may be based on a hierarchical structure of signal contents, which may provide for more efficient encoding and decoding of common data and dedicated data. For example, the ramification coding structure 400 may be based on a quantity of hierarchical levels (e.g., 4 levels as shown in FIG. 4). The transmitter may apply a machine learning model for the quantity of hierarchical levels to identify a set of bits that may be allocated to a common code segment 405 and a set of bits that may be allocated to a dedicated code segment 410 based on the contents of the set of messages scheduled to be transmitted to the receiver (e.g., common data). By using machine learning, the transmitter may identify how many bits of the ramification codeword are common (e.g., shared between the receivers) and how many bits are dedicated (e.g., unique for a single receiver).

The transmitter may apply the machine learning model to optimize formatting of signal payloads for a particular scenario. For example, in a dense UE environment where many users may share common data (e.g., a sporting event stadium) or in an environment where many users repeat similar payloads (e.g., an industrial or a private network), the transmitter may use the machine learning model to allocate the common data to the common code segments 405 of the ramification coding structure 400 and transmit the ramification coding structure 400 to the users using a common resource to improve resource utilization efficiency.

In some cases, the transmitter may perform continual online learning using the machine learning model to improve the efficiency of the ramification coding structure 400. In some examples, the machine learning model may use a set of one or more parameters as inputs, which may include an aggregated user activity parameter associated with the multiple receivers, a user signal format parameter associated with the multiple users, a cell loading parameter associated with the multiple users, or any other analytics that may be related to communications between the transmitter and the receivers. In some cases, the machine learning model may be trained using the parameters. As such, the transmitter may train the machine learning model using the parameters, and based on how the parameters change for each receiver, the machine learning model may enable the transmitter to optimize the ramification coding structure 400.

In some examples, an aggregated user activity parameter associated with the multiple receivers may be used to train the machine learning model to allocate different quantities of shared bits to common code segments 405. For example, as the quantity of similar users in a coverage area supported by the transmitter increases, the machine learning model may be trained to allocate a larger quantity of bits to a common code segment 405 to be shared between the similar users. As the quantity of similar users in the coverage area decreases, the machine learning model may be trained to allocate a smaller quantity of bits to the common code segment 405.

Additionally, or alternatively, as common data may be repeatedly and frequently communicated between the transmitter and the receivers (e.g., in a private network of factory setting with repetitive, similar payloads) a user signal format parameter associated with multiple users may be used to train the machine learning model to reuse a common code segment 405 for multiple transmissions such that the receivers may refrain from decoding the common code segment 405 for each transmission, thereby saving time and processing resources. For example, when large amounts of data are shared between a large number of receivers, the machine learning model may be trained to reuse a common code segment 405 for multiple transmissions to the receivers. When small amounts of data are shared between multiple receivers, the machine learning model may be trained to refrain from reusing the common code segment 405 for multiple transmissions in favor or using more dedicated code segments 410.

In some examples, a cell loading parameter associated with multiple users may be used to train the machine learning model to allocate a defined quantity of bits between a common code segment 405 and a dedicated code segment 410. When cell loading is high (e.g., exceeds a threshold, satisfies a threshold), the machine learning model may be trained to increase a quantity of bits allocated to the common code segment 405 attempting to reduce a cell load. When the cell loading is low (e.g., fails to exceed a threshold), the machine learning model may be trained to decrease a quantity of bits allocated to the common code segment 405. As used herein, "satisfies a threshold" may, depending on the context, refer to a value being greater than the threshold, greater than or equal to the threshold, less than the threshold, less than or equal to the threshold, equal to the threshold, not equal to the threshold, or the like.

In some examples, the transmitter may use a machine learning model such as a GNN to determine the ramification coding structure 400. For example, the transmitter may use a GNN to learn and identify an optimum graph for PDCCH signaling given a cell of connected receivers (e.g., UEs). In some examples, the GNN may include specialized operations such as weight and feature sparsification (e.g., which may be widely adopted into tasks such as representation learning and social networking). The transmitter may use graph representation learning model for resource minimization as shown in Equation 1:

$$\operatorname*{argmin}_{G} \sum_{i=0}^{E-1} \text{edge}_i \quad (1)$$

where $\text{edge}_i$ may represent an edge i of a graph G, and where each edge i may occupy particular encoded bits (e.g., in the form of resource block resources). That is, each $\text{edge}_i$ may have a weight (e.g., a payload size) in terms of quantity of bits. By summing up each $\text{edge}_i$ according to Equation 1, the transmitter may determine a size of a payload (e.g., messages to be transmitted to receivers). In some examples, the transmitter may use the GNN to identify the smallest total payload size and optimize resource usage in a case where the transmitter is transmitting signaling to many receivers. Out of the total payload size (e.g., a total quantity of bits), the transmitter may allocate a first set of bits to a common code segment 405 and a second set of bits to a dedicated code segment 410.

To prevent the ramification coding structure 400 from being overly complicated, a maximum quantity of hierarchical levels in the ramification coding structure 400 may be determined. As such, the transmitter may encode a ramification codeword without exceeding the maximum quantity of hierarchical levels, which may enable the transmitter to optimize the ramification coding structure 400 and an associated dynamic signaling format. In some cases, the common code segments 405 may have different degrees of commonality (e.g., based on a beamforming angle in an MU-MIMO communications system), where the higher hierarchical levels may have more commonality than lower segments. For example, a common code segment 405-a may have a higher degree of commonality than a common code segment 405-b which may be on a lower hierarchical level. In addition, the lower hierarchical levels may include more dedicated code segments 410 than common code segments 405.

In some examples, based on the continual, online learning, the transmitter may infer a ramification coding structure 400 that is optimal (e.g., an optimal grouping of common and dedicated bits) and dynamic signal format (e.g., reflecting common code segments 405 for groups of users and dedicated code segments 410 for individual users) by which to encode and transmit a ramification codeword. For example, the transmitter may use the GNN to identify common code segments 405 of the ramification codeword that may be shared between multiple receivers. In some examples, the transmitter may identify a common code segment 405-a and allocate a set of bits to the common code segment 405-a that may be common for the receivers. Additionally, or alternatively, the transmitter may use the GNN to allocate a different set of bits to a dedicated code segment 410-a (e.g., a ramified code segment) for a first receiver, a dedicated code segment 410-b (e.g., a ramified code segment) for a second receiver, and so on. As such, the GNN may enable the transmitter to format the ramification coding structure 400 to have different common code segments 405 and dedicated code segments 410 based on the type of signaling being transmitted to multiple receivers.

After encoding the ramification codewords (e.g., PDCCH codewords) using the ramification coding structure 400 and in a dynamic signaling format and dynamic schedule, the transmitter may transmit the ramification codewords to respective receivers using the dynamic signaling format. Based on the ramification coding structure 400, the receivers may decode the respective ramification codewords and obtain a common code segment 405 and corresponding dedicated code segments 410.

Figure 5:
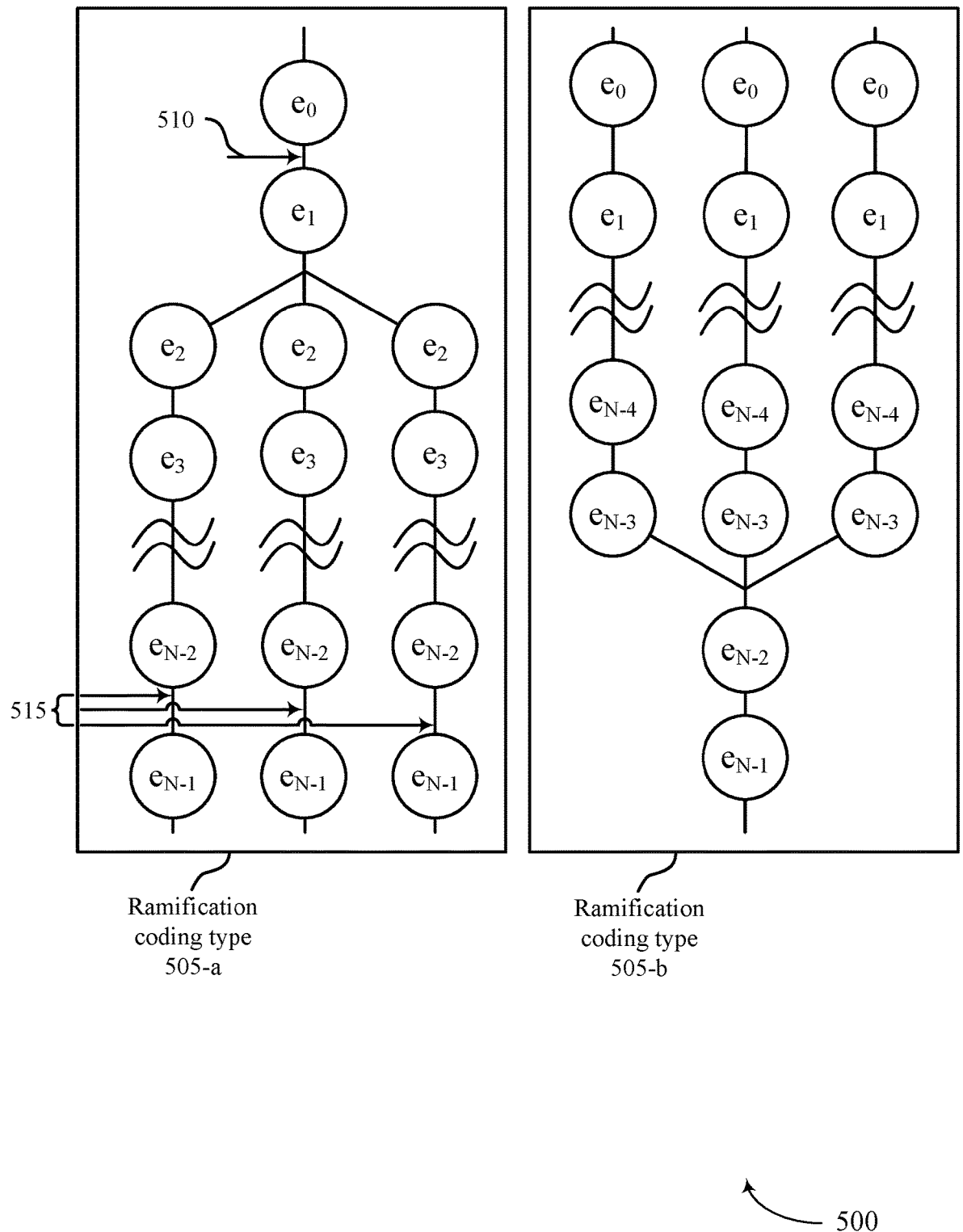
FIG. 5 illustrates an example of a ramification coding scheme that supports learning-based dynamic signal formatting with ramification coding in accordance with aspects of the present disclosure.

FIG. 5 illustrates an example of a ramification coding scheme 500 that supports learning-based dynamic signal formatting with ramification coding in accordance with aspects of the present disclosure. In some examples, the ramification coding scheme 500 may be implemented by a transmitter (e.g., a base station, a UE) and in accordance with a ramification coding type 505-a (e.g., Type 1) or a ramification coding type 505-b (e.g., Type 2).

As described herein, a transmitter (e.g., a base station, a UE) may use a ramification coding structure to allocate (e.g., and encode) some bits of a ramification codeword to a common code segment of the ramification codeword and some other bits to a dedicated code segment of the ramification codeword, which the transmitter may then transmit to a respective receiver (e.g., a UE, a base station). In some examples, the transmitter may encode the ramification codeword using the ramification coding type 505-a, the ramification coding type 505-b, or another ramification coding type. For example, the transmitter may transmit control signaling to a receiver indicating that the ramification codeword is encoded using the ramification coding type 505-a, and as such, the receiver may decode the ramification codeword based on the ramification coding type 505-b. The ramification coding type 505-a and the ramification coding type 505-b may include a quantity of encoded bits, $e_j$ which may be structured differently based on the ramification coding type 505.

In some examples, the ramification coding type 505-a and the ramification coding type 505-b may be represented as tree-like structures. For example, the ramification coding type 505-a may include a root at the top of the tree-like structure, which may indicate a shared (e.g., common) portion of a ramification codeword. The root may include an encoded bit $e_0$ and an encoded bit $e_1$ that may be allocated to a resource allocation 510 corresponding to a common resource. That is, $e_0$ and $e_1$ may share a resource element allocation for one common instance (e.g., a copy). A ramified portion of the ramification codeword may branch downward to accommodate three individual users, and the ramified portion may include an encoded bit $e_2$, an encoded bit $e_3$, an encoded bit $e_{N-2}$ and an encoded bit $e_{N-1}$, each allocated to dedicated resources corresponding to each user (e.g., each instance of an encoded bit is a dedicated instance for a particular user). For example, a resource allocation 515 may include a dedicated resource for each dedicated instance (e.g., three dedicated instances) of the encoded bits $e_2$, $e_3$, $e_{N-2}$, and $e_{N-1}$.

In the ramification coding type 505-a (e.g., Type 1), an M quantity of codewords may share a beginning subset piece of encoded bits (e.g., the root at the top of the tree-like structure, a common code segment). During encoding, since the beginning portion of source bits may be identical (e.g., $e_0$ and $e_1$), the transmitter (e.g., an encoder component of the transmitter) may use one encoding instance and take the beginning portion of the source bits sequentially. The encoder states may be stored, and the transmitter may proceed with ramification coding with each of the M source instances (e.g., for source bits beyond the beginning portion of shared bits, the dedicated code segment). At the end of the encoding (e.g., sequential encoding or parallel encoding), the transmitter may derive the M codewords. In some examples, the ramification coding type 505-a may support convolution codes.

The ramification coding type 505-b may include a root at the bottom of the tree-like structure (e.g., opposite from the ramification coding type 505-a). That is, the shared portion of a ramification codeword (e.g., corresponding to a common resource) may be at the bottom of the tree-like structure, which may include an encoded bit $e_{N-1}$ and an encoded bit $e_{N-2}$ that may be allocated to a resource allocation corresponding to a common resource. The ramified portion of the ramification codeword (e.g., corresponding to dedicated resources) may branch upward to accommodate three individual users, and the ramified portion may include an encoded bit $e_{N-3}$, an encoded bit $e_{N-4}$, an encoded bit $e_1$, and an encoded bit $e_0$, each allocated to dedicated resources corresponding to each user.

In the ramification coding type 505-b (e.g., Type 2), an M quantity of codewords may share an ending subset piece of encoded bits (e.g., the root at the bottom of the tree-like structure, a common code segment). During encoding, since the ending portion of source bits may be identical (e.g., $e_{N-1}$ and $e_{N-2}$), the transmitter (e.g., an encoder) may optionally encode that ending portion of encoded bits. The rest of the unshared bits (e.g., the dedicated code segment), including $e_{N-3}$, $e_{N-4}$, $e_1$, and $e_0$ may each be encoded independently. In some examples, the ramification coding type 505-b may support polar coding.

In some cases, the ramification coding structure may indicate an interleaving pattern applied to interleave the common code segment and the dedicated code segment to generate the ramification codeword. For example, the transmitter may use intra-portion interleaving to interleave bits of the same shared or unshared portion (e.g., common code segment or dedicated code segment) within that same shared or unshared portion. In some examples, the transmitter may use other ramification coding types that include interleaving, which may enable the transmitter to reuse common code segments throughout the ramification coding structure.

In some examples, for both the ramification coding type 505-a and the ramification coding type 505-b, the transmitter may allocate the shared encoded bits $e_j$ (e.g., in the common code segment) with shared physical resources. For example, as described with reference to FIG. 3, the transmitter may allocate any shared (e.g., common) bits to a common resource. The transmitter may allocate the non-shared encoded bits (e.g., the dedicated code segment to unshared physical resources for all M codewords. For example, the transmitter may allocate dedicated bits to respective dedicated resources that correspond to individual receivers. In some cases, the ramification coding structure may indicate that the ramification codeword concatenates the common code segment and the dedicated code segment.

Additionally, or alternatively, for both the ramification coding type 505-a and the ramification coding type 505-b, each individual receiver may receive both shared portions (e.g., common code segments) and unshared portions (e.g., dedicated code segments) of a respective ramification codeword and concatenate the shared and unshared portions into one complete ramification codeword according to the indices of the encoded bits $e_j$. Each receiver may decode the ramification codeword based on the ramification coding structure indicating the concatenation. As such, each receiver may monitor a respective common resource and a respective dedicated resource to obtain and decode its corresponding ramification codeword.

Figure 6:
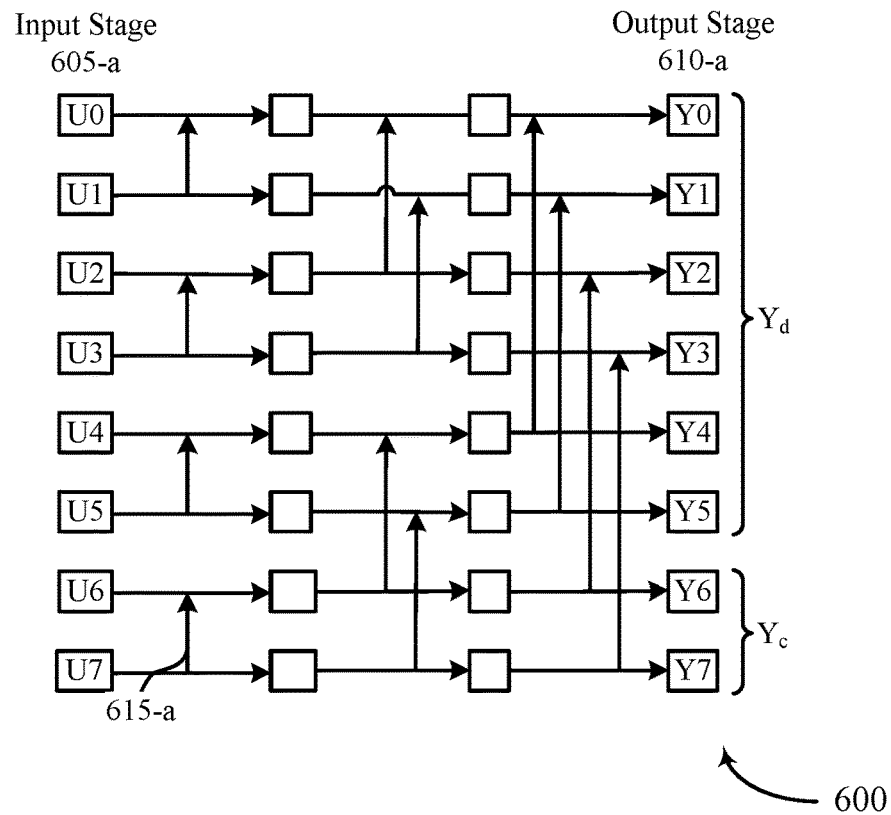
FIG. 6 illustrates examples of polar coding schemes that support learning-based dynamic signal formatting with ramification coding in accordance with aspects of the present disclosure.
Figure 6:
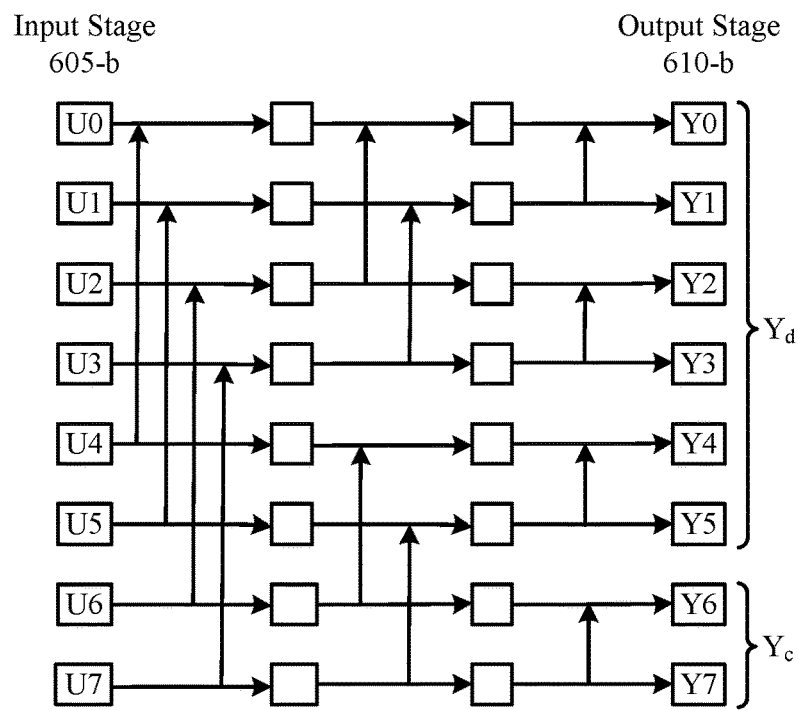

FIG. 6 illustrates an example of a polar coding scheme 600 and a polar coding scheme 601 that supports learning-based dynamic signal formatting with ramification coding in accordance with aspects of the present disclosure. In some examples, an encoder (e.g., a polar encoder) may apply the polar coding scheme 600, the polar coding scheme 601, or other polar coding schemes having similar properties to respectively polar encode information vectors.

Each of the polar coding scheme 600 and the polar coding scheme 601 may include a defined number of encoding branches. Depicted are branches 0 to 7, but the polar coding scheme 600 and the polar coding scheme 601 may include any number of encoding branches. Bits of an information vector U may be loaded into an input stage 605-a for the polar coding scheme 600 and an input stage 605-*b* for the polar coding scheme 601, and polar-encoded bits may be output from an output stage 610-*a* for the polar coding scheme 600 and an output stage 610-*b* for the polar coding scheme 600. In some examples, an information vector U may include 8 bits. In addition, a codeword Y output at the output stage 610 may include 8 bits. In each of the polar coding scheme 600 and the polar coding scheme 601, a bit U may be input at the input stage 605 at each of branches 0 to 7 (e.g., U0, U1, . . . , U7), and a polar-encoded codeword Y may be formed by the polar-encoded bits output by the branches 0 to 7 (e.g., Y0, Y1, . . . , Y7) at the output stage 610.

In some examples, bits loaded into the higher number branches may be less dependent on bits loaded into lower number branches. For example, the direction of the arrows on the encoding branches in the polar coding scheme 600 and the polar coding scheme 601 indicate that a bit loaded at encoding branch 7 may be independent of any of the bits loaded into any other branch. The bit loaded at branch 6 may depend on the bit loaded at branch 7 (e.g., the directional encoding branch 615-*a* in the polar coding scheme 600) and no other bits. Continuing toward the lower number branches, the bits loaded into the lower number branches may be generally more dependent on bits loaded into higher number branches. By encoding with respect to a single direction corresponding to the number of encoding branches (e.g., from higher number branches such as branch 7 and branch 6 to lower number branches such as branch 3 and branch 2, but not from lower number branches to higher number branches), a nested signaling structure for grouping various information fields may be employed.

The techniques described herein may use the unidirectional branch dependency of the polar coding scheme 600 and the polar coding scheme 601 to polar encode common data and dedicated data to be transmitted to multiple receivers (e.g., a group of users). For example, a transmitter may identify common data that is shared among the multiple receivers (e.g., the same information being sent to multiple receivers), and the transmitter may allocate bits of the common data into branches of the polar coding scheme 600 and the polar coding scheme 601 that may be less dependent on other branches. For example, a first bit of the common information $U_c$ may be loaded into branch 7, and a second bit of the common information $U_c$ may be loaded into branch 6. In addition, the transmitter may allocate dedicated bits $U_d$ into other branches that may be more dependent on other branches. For example, a first bit of the dedicated information $U_d$ may be loaded into branch 5, a second bit of the dedicated information $U_d$ may be loaded into branch 4, a third bit of the dedicated information $U_d$ may be loaded into branch 3, and a fourth bit of the dedicated information $U_d$ may be loaded into branch 2.

The polar-encoded codeword Y may include two parts, $Y_c$, which may correspond to a common (e.g., shared) portion of polar code, and $Y_d$, which may correspond to a dedicated portion of polar code. As shown in FIG. 6, the polar-encoded bits $Y_c$, output from branches 6 and 7, may be independent of the bits loaded into branches 0 to 5. Thus, even though the dedicated information may vary between different receivers, the polar-encoded bits $Y_c$ may be the same in each codeword Y. The base station 105-*a* may use this fact when mapping codewords $Y_0$ to $Y_7$ to conserve control channel resources. In some examples, the directional properties of the polar coding scheme 600 and the polar coding scheme 601 may be used for other types of coding (e.g., convolutional coding, polar coding, and the like).

Figure 7:
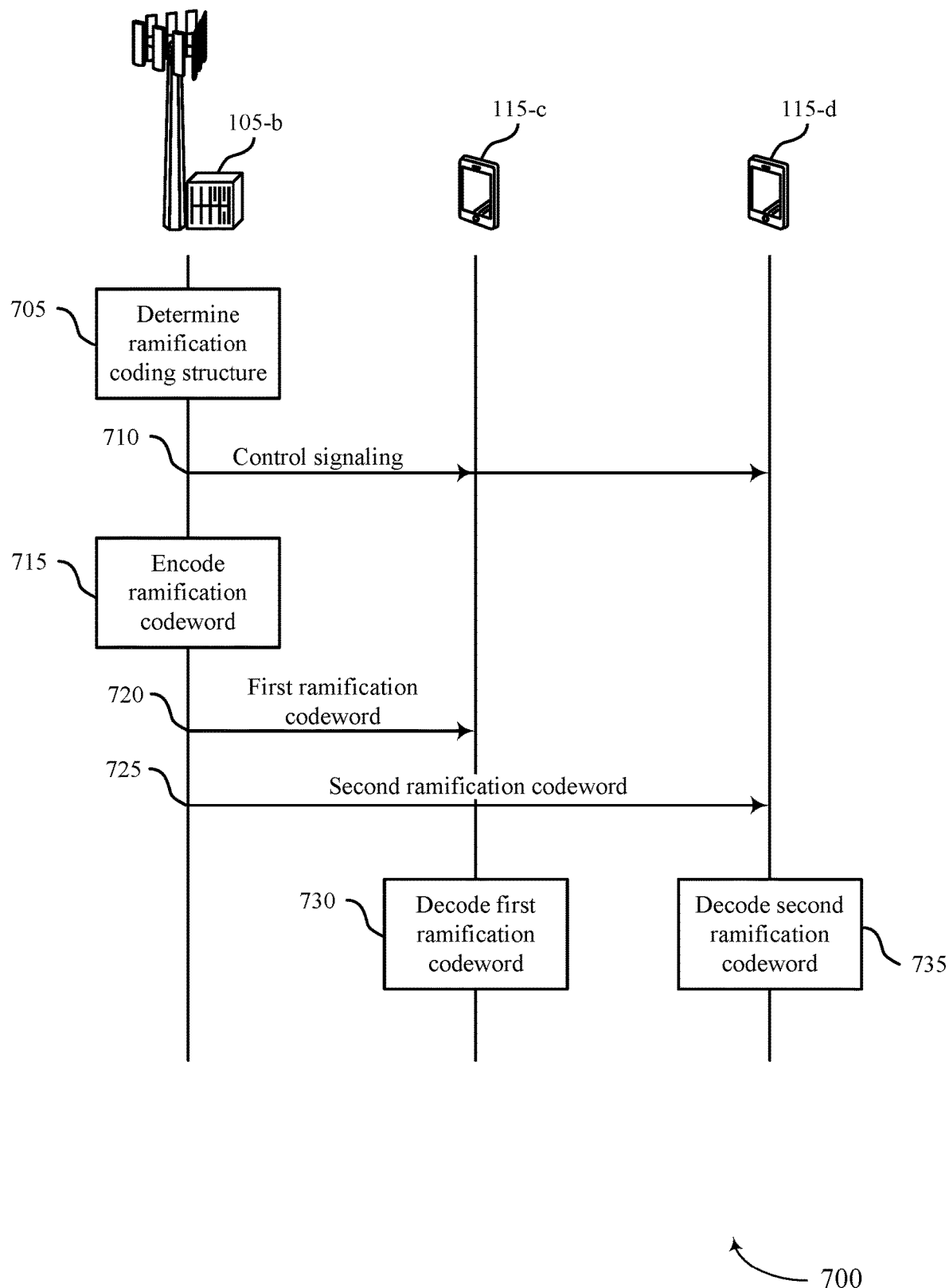
FIG. 7 illustrates an example of a process flow that supports learning-based dynamic signal formatting with ramification coding in accordance with aspects of the present disclosure.

FIG. 7 illustrates an example of a process flow 700 that supports learning-based dynamic signal formatting with ramification coding in accordance with aspects of the present disclosure. The process flow 700 may implement aspects of wireless communications systems 100 and 200, or may be implemented by aspects of the wireless communications system 100 and 200. For example, the process flow 700 may illustrate operations between a base station 105-*b*, a UE 115-*c*, and a UE 115-*d*, which may be examples of corresponding devices described herein. In the following description of the process flow 700, the operations between the base station 105-*b*, the UE 115-*c*, and the UE 115-*d* may be transmitted in a different order than the example order shown, or the operations performed by the base station 105-*b*, the UE 115-*c*, and the UE 115-*d* may be performed in different orders or at different times. Some operations may also be omitted from the process flow 700, and other operations may be added to the process flow 700.

At 705, the base station 105-*b* (e.g., a transmitter) may determine a ramification coding structure for a set of messages scheduled to be transmitted to a set of UEs 115 (e.g., a set of receivers). In some examples, the ramification coding structure may be based on common data in the set of messages scheduled to be transmitted to the set of UEs 115, a quantity of hierarchical levels, a machine learning model, or any combination thereof. For example, the base station 105-*b* may apply, for the quantity of hierarchical levels identified for ramification coding, a machine learning model to identify common data in the set of messages to determine the ramification coding structure.

At 710, the base station 105-*b* may transmit, to the UE 115-*c*, control signaling that indicates a common resource that is commonly allocated to the UEs 115 including the UE 115-*c*, a dedicated resource that is allocated to the UE 115-*c*, and the ramification coding structure, which may indicate a common code segment and a dedicated code segment of a ramification codeword. In addition, the base station 105-*b* may transmit, to the UE 115-*d*, control signaling that indicates a common resource that is commonly allocated to the UEs 115 including the UE 115-*d*, a dedicated resource that is allocated to the UE 115-*d*, and the ramification coding structure. As such, the UE 115-*c* and the UE 115-*d* may share the common code segment and the common resource and each have an individual dedicated code segment and corresponding dedicated resource.

At 715, the base station 105-*b* may encode the common data and dedicated data for the UE 115-*c* into at least one ramification codeword in a dynamic signaling format. In some cases, the base station 105-*b* may allocate, based on the ramification coding structure, a first set of bits of the first ramification codeword to the common code segment and a second set of bits of the first ramification codeword to the dedicated code segment, where the encoding may be based on the allocating. The base station 105-*b* may encode the common data and dedicated data for the UE 115-*c* into a first ramification codeword and the base station 105-*a* may encode the common data and different dedicated data for the UE 115-*d* into a second ramification codeword, where the common data may be the same for both ramification codewords.

At 720, the base station 105-*b* may transmit the first ramification codeword to the UE 115-*c* via the common resource and a first dedicated resource, using the dedicated signaling format. For example, the base station 105-*b* may transmit the common code segment of the first ramification codeword using the common resource and a first dedicated code segment of the first ramification codeword using the first dedicated resource. At 725, the base station 105-*b* may transmit the second ramification codeword to the UE 115-*d* via the common resource and a second dedicated resource, using the dedicated signaling format. As the common code segment may be the same for the first ramification codeword and the second ramification codeword, the UE 115-*c* and the UE 115-*d* may share the common code segment and the common resource.

At 730, the UE 115-*c* may decode the first ramification codeword to obtain the common code segment and the first dedicated code segment based on the ramification coding structure. At 735, the UE 115-*d* may decode the second ramification codeword to obtain the common code segment and the second dedicated code segment based on the ramification coding structure. For example, the UE 115-*c* and the UE 115-*d* may successfully decode their respective ramification codewords if they are aware of the ramification coding structure and allocation of common and dedicated bits.

Figure 8:
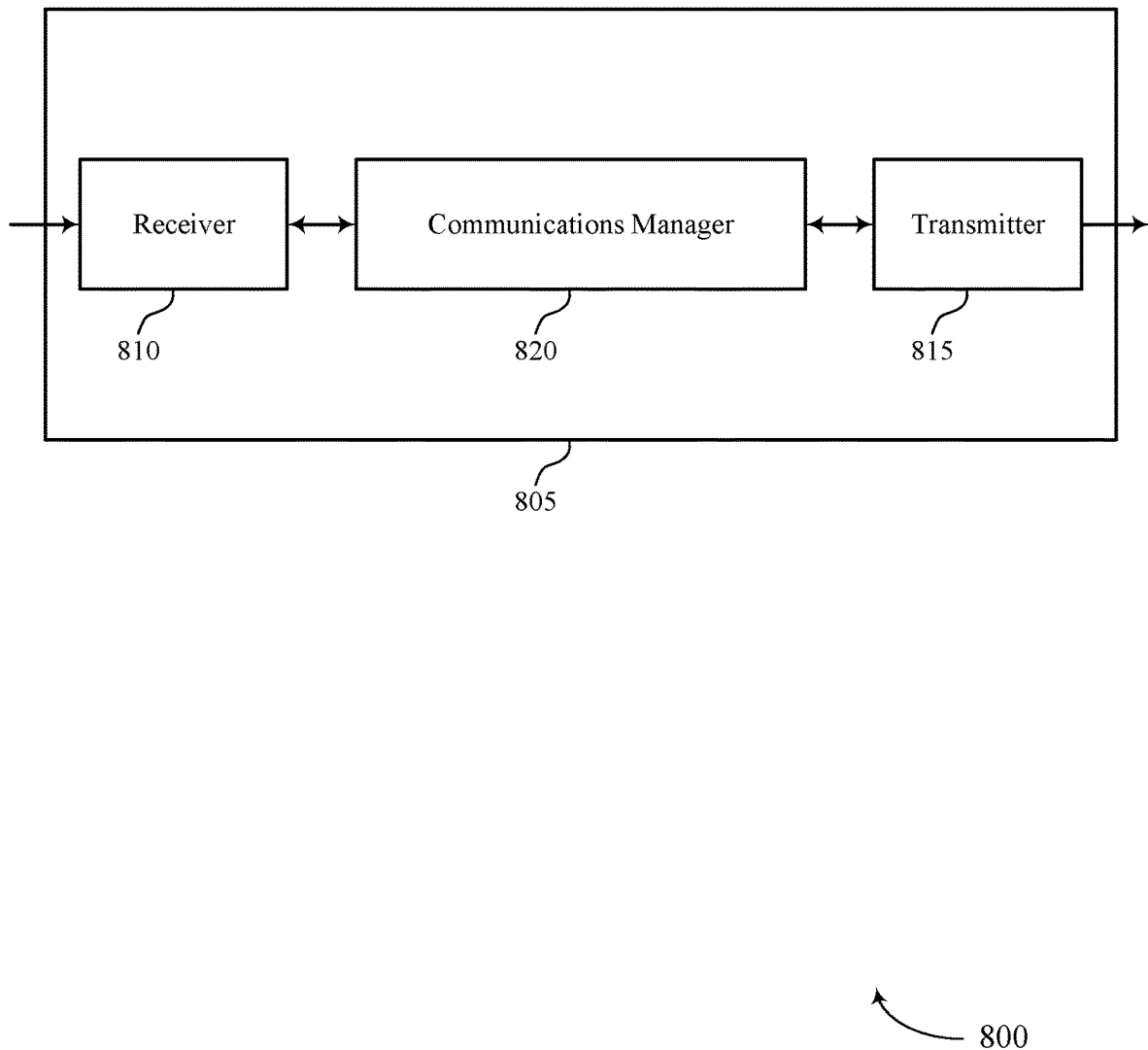
FIGS. 8 and 9 show block diagrams of devices that support learning-based dynamic signal formatting with ramification coding in accordance with aspects of the present disclosure.

FIG. 8 shows a block diagram 800 of a device 805 that supports learning-based dynamic signal formatting with ramification coding in accordance with aspects of the present disclosure. The device 805 may be an example of aspects of a transmitter (e.g., a base station 105) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to learning-based dynamic signal formatting with ramification coding). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to learning-based dynamic signal formatting with ramification coding). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of learning-based dynamic signal formatting with ramification coding as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure.

In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first transmitter in accordance with examples as disclosed herein. For example, the communications manager 820 may be configured as or otherwise support a means for transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The communications manager 820 may be configured as or otherwise support a means for encoding the common data and dedicated data of the first receiver into at least one ramification codeword in a dynamic signaling format based on the ramification coding structure. The communications manager 820 may be configured as or otherwise support a means for transmitting the at least one ramification codeword in the dynamic signaling format via the common resource and the dedicated resource.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for learning-based dynamic signal formatting with ramification coding, which may increase resource utilization efficiency and reduce processing at receivers and transmitters.

Figure 9:
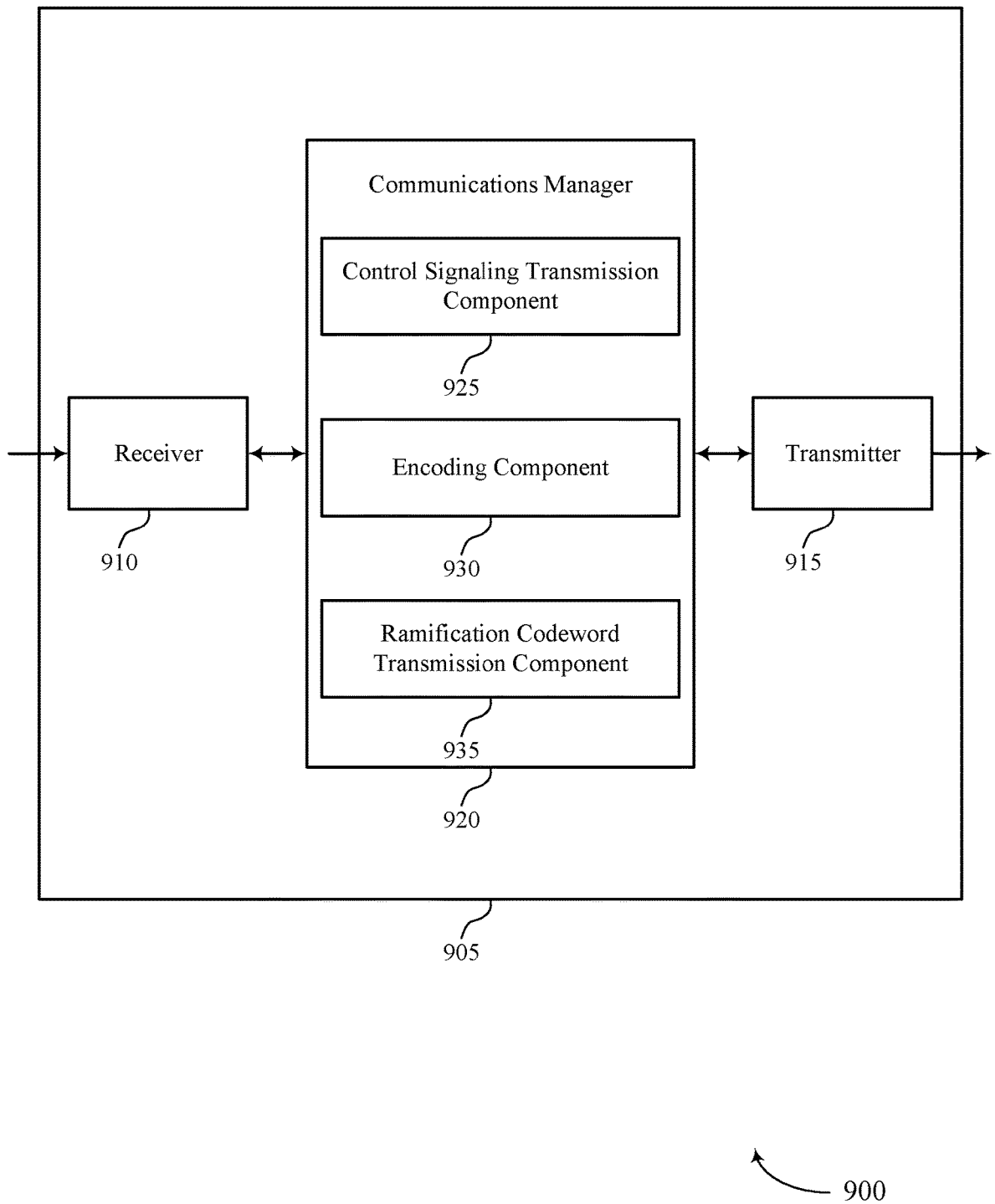

FIG. 9 shows a block diagram 900 of a device 905 that supports learning-based dynamic signal formatting with ramification coding in accordance with aspects of the present disclosure. The device 905 may be an example of aspects of a device 805 or a transmitter (e.g., a base station 105) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to learning-based dynamic signal formatting with ramification coding). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to learning-based dynamic signal formatting with ramification coding). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of learning-based dynamic signal formatting with ramification coding as described herein. For example, the communications manager 920 may include a control signaling transmission component 925, an encoding component 930, a ramification codeword transmission component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first transmitter in accordance with examples as disclosed herein. The control signaling transmission component 925 may be configured as or otherwise support a means for transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The encoding component 930 may be configured as or otherwise support a means for encoding the common data and dedicated data of the first receiver into at least one ramification codeword in a dynamic signaling format based on the ramification coding structure. The ramification codeword transmission component 935 may be configured as or otherwise support a means for transmitting the at least one ramification codeword in the dynamic signaling format via the common resource and the dedicated resource.

Figure 10:
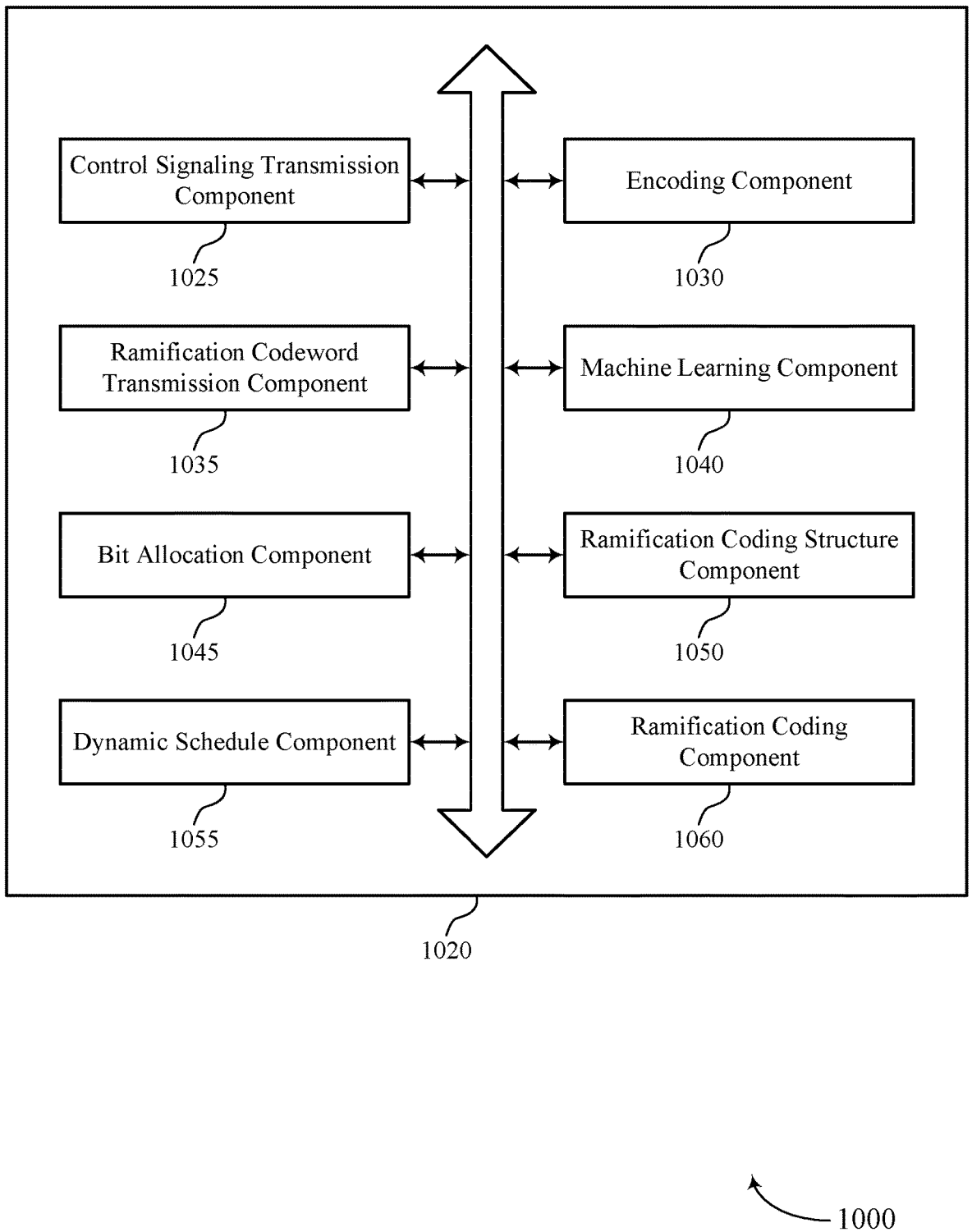
FIG. 10 shows a block diagram of a communications manager that supports learning-based dynamic signal formatting with ramification coding in accordance with aspects of the present disclosure.

FIG. 10 shows a block diagram 1000 of a communications manager 1020 that supports learning-based dynamic signal formatting with ramification coding in accordance with aspects of the present disclosure. The communications manager 1020 may be an example of aspects of a communications manager 820, a communications manager 920, or both, as described herein. The communications manager 1020, or various components thereof, may be an example of means for performing various aspects of learning-based dynamic signal formatting with ramification coding as described herein. For example, the communications manager 1020 may include a control signaling transmission component 1025, an encoding component 1030, a ramification codeword transmission component 1035, a machine learning component 1040, a bit allocation component 1045, a ramification coding structure component 1050, a dynamic schedule component 1055, a ramification coding component 1060, or any combination thereof. Each of these components may communicate, directly or indirectly, with one another (e.g., via one or more buses).

The communications manager 1020 may support wireless communication at a first transmitter in accordance with examples as disclosed herein. The control signaling transmission component 1025 may be configured as or otherwise support a means for transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The encoding component 1030 may be configured as or otherwise support a means for encoding the common data and dedicated data of the first receiver into at least one ramification codeword in a dynamic signaling format based on the ramification coding structure. The ramification codeword transmission component 1035 may be configured as or otherwise support a means for transmitting the at least one ramification codeword in the dynamic signaling format via the common resource and the dedicated resource.

In some examples, the ramification coding structure for the set of multiple messages is based on a quantity of hierarchical levels. In some examples, the machine learning component 1040 may be configured as or otherwise support a means for applying, for the quantity of hierarchical levels, a machine learning model to identify the common data in the set of multiple messages.

In some examples, to support applying the machine learning model, the machine learning component 1040 may be configured as or otherwise support a means for applying, using a set of one or more parameters, the machine learning model to allocate a first set of bits of the ramification codeword to the common code segment and a second set of bits of the ramification codeword to the dedicated code segment. In some examples, to support applying the machine learning model, the machine learning component 1040 may be configured as or otherwise support a means for where the set of one or more parameters includes at least one of an aggregated user activity parameter associated with the set of multiple receivers, a user signal format parameter associated with the set of multiple receivers, or a cell loading parameter associated with the set of multiple receivers.

In some examples, the machine learning model includes a GNN. In some examples, the bit allocation component 1045 may be configured as or otherwise support a means for allocating, based on the ramification coding structure, a first set of bits of the ramification codeword to the common code segment and a second set of bits of the ramification codeword to the dedicated code segment, where encoding the ramification codeword is based on the allocating.

In some examples, the ramification coding structure indicates a quantity of bits to be used for the common code segment of the ramification codeword based on the common data in the set of multiple messages. In some examples, the control signaling indicates an ending of the common code segment of the ramification codeword and a beginning of the dedicated code segment of the ramification codeword.

In some examples, the control signaling indicates a dynamic schedule based on a duration of the dynamic signaling format, a periodicity of the dynamic signaling format, or both. In some examples, the dynamic schedule is periodic, semi-persistent, or persistent.

In some examples, the control signaling indicates the ramification codeword is encoded using a first ramification coding type of a set of multiple types of ramification coding, where the ramification codeword is decoded based on the first ramification coding type.

In some examples, the first ramification coding type indicates that a beginning subset or an ending subset of bits of the ramification codeword are the common code segment. In some examples, the first ramification coding type indicates that the ramification codeword is encoded using convolution coding or polar coding.

In some examples, the control signaling schedules a transmission of a message in the common resource and the dedicated resource. In some examples, the control signaling indicates the ramification codeword concatenates the common code segment and the dedicated code segment.

In some examples, the control signaling indicates an interleaving pattern applied to interleave the common code segment and the dedicated code segment to generate the ramification codeword. In some examples, the ramification codeword includes a control message codeword or a data message codeword.

Figure 11:
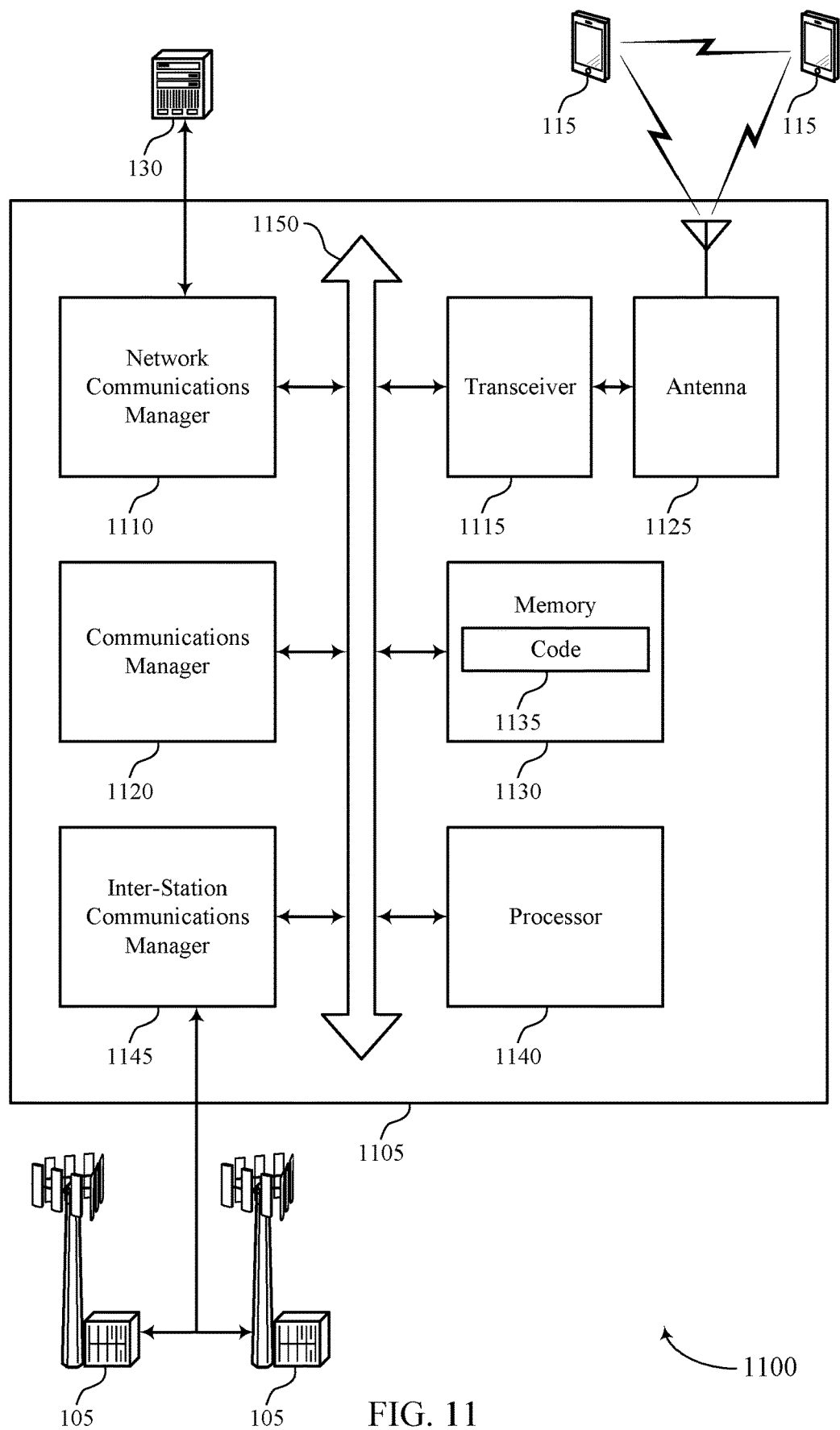
FIG. 11 shows a diagram of a system including a device that supports learning-based dynamic signal formatting with ramification coding in accordance with aspects of the present disclosure.

FIG. 11 shows a diagram of a system 1100 including a device 1105 that supports learning-based dynamic signal formatting with ramification coding in accordance with aspects of the present disclosure. The device 1105 may be an example of or include the components of a device 805, a device 905, or a transmitter (e.g., a base station 105) as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting learning-based dynamic signal formatting with ramification coding). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other transmitters or base stations 105, and may include a controller or scheduler for controlling communications with receivers or UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a first transmitter in accordance with examples as disclosed herein. For example, the communications manager 1120 may be configured as or otherwise support a means for transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The communications manager 1120 may be configured as or otherwise support a means for encoding the common data and dedicated data of the first receiver into at least one ramification codeword in a dynamic signaling format based on the ramification coding structure. The communications manager 1120 may be configured as or otherwise support a means for transmitting the at least one ramification codeword in the dynamic signaling format via the common resource and the dedicated resource.

By including or configuring the communications manager 1120 in accordance with examples as described herein, the device 1105 may support techniques for learning-based dynamic signal formatting with ramification coding, which may increase resource utilization efficiency, improve communication reliability, and improve coordination between wireless devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of learning-based dynamic signal formatting with ramification coding as described herein, or the processor 1140 and the memory 1130 may be otherwise configured to perform or support such operations.

Figure 12:
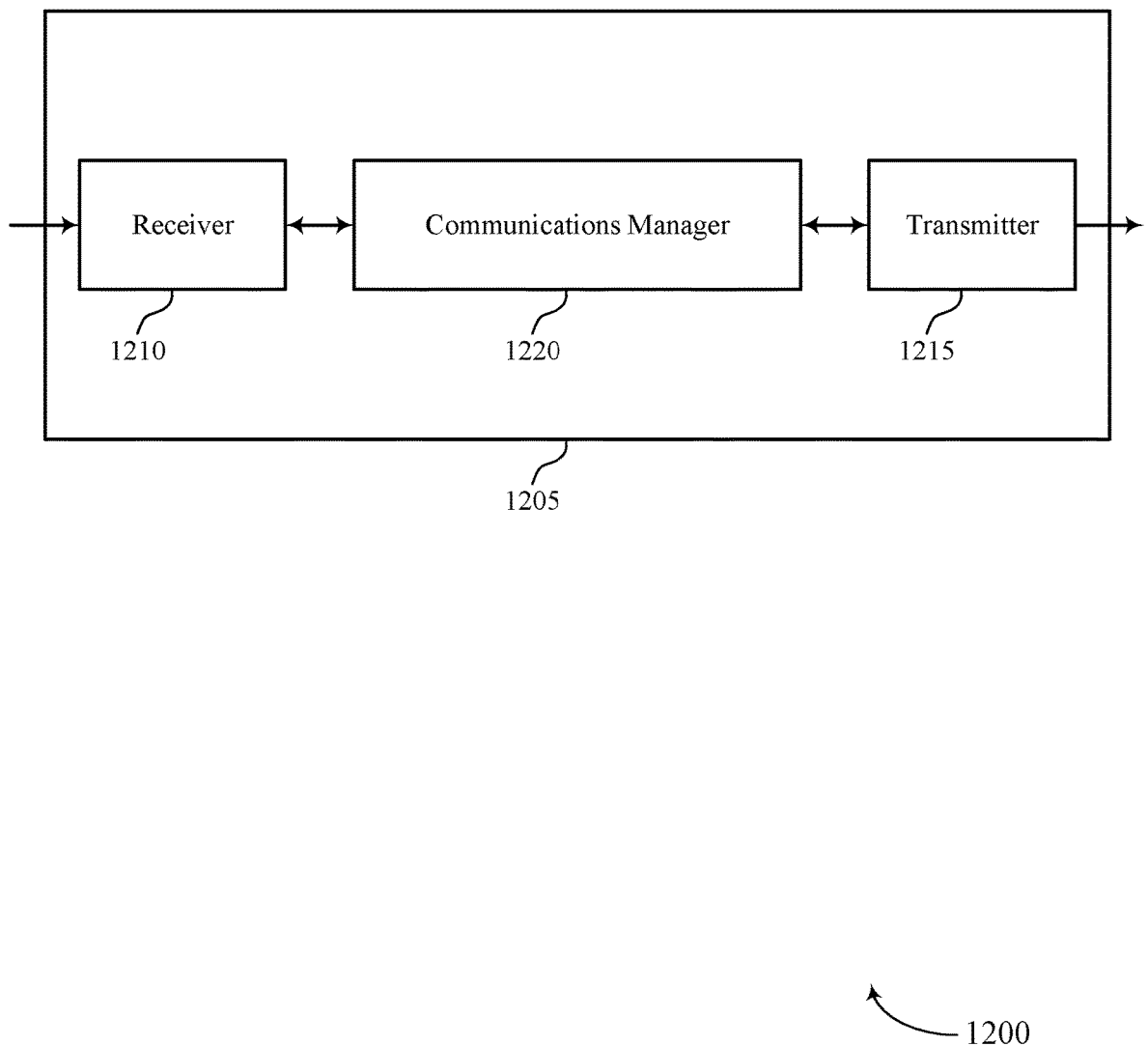
FIGS. 12 and 13 show block diagrams of devices that support learning-based dynamic signal formatting with ramification coding in accordance with aspects of the present disclosure.

FIG. 12 shows a block diagram 1200 of a device 1205 that supports learning-based dynamic signal formatting with ramification coding in accordance with aspects of the present disclosure. The device 1205 may be an example of aspects of a receiver (e.g., a UE 115) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to learning-based dynamic signal formatting with ramification coding). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to learning-based dynamic signal formatting with ramification coding). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of learning-based dynamic signal formatting with ramification coding as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first receiver in accordance with examples as disclosed herein. For example, the communications manager 1220 may be configured as or otherwise support a means for receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The communications manager 1220 may be configured as or otherwise support a means for receiving, based on the control signaling, at least one ramification codeword in a dynamic signaling format via the common resource and the dedicated resource that is allocated to the first receiver. The communications manager 1220 may be configured as or otherwise support a means for decoding the at least one ramification codeword in the dynamic signaling format to obtain the common code segment and a first dedicated code segment for the first receiver based on the ramification coding structure.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for learning-based dynamic signal formatting with ramification coding, which may increase resource utilization efficiency and reduce processing at receivers and transmitters.

Figure 13:
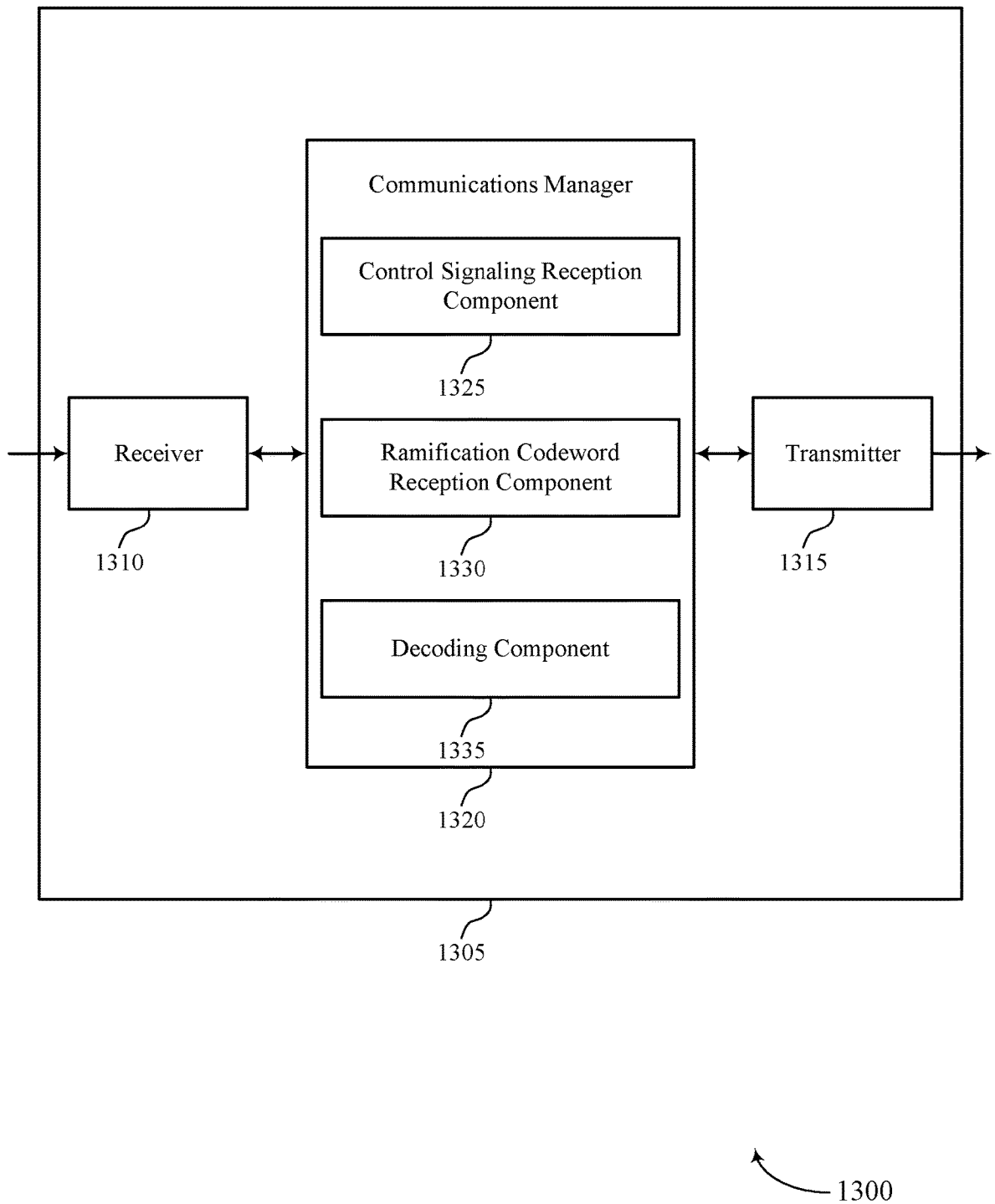

FIG. 13 shows a block diagram 1300 of a device 1305 that supports learning-based dynamic signal formatting with ramification coding in accordance with aspects of the present disclosure. The device 1305 may be an example of aspects of a device 1205 or a receiver (e.g., a UE 115) as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to learning-based dynamic signal formatting with ramification coding). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to learning-based dynamic signal formatting with ramification coding). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of learning-based dynamic signal formatting with ramification coding as described herein. For example, the communications manager 1320 may include a control signaling reception component 1325, a ramification codeword reception component 1330, a decoding component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a first receiver in accordance with examples as disclosed herein. The control signaling reception component 1325 may be configured as or otherwise support a means for receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The ramification codeword reception component 1330 may be configured as or otherwise support a means for receiving, based on the control signaling, at least one ramification codeword in a dynamic signaling format via the common resource and the dedicated resource that is allocated to the first receiver. The decoding component 1335 may be configured as or otherwise support a means for decoding the at least one ramification codeword in the dynamic signaling format to obtain the common code segment and a first dedicated code segment for the first receiver based on the ramification coding structure.

Figure 14:
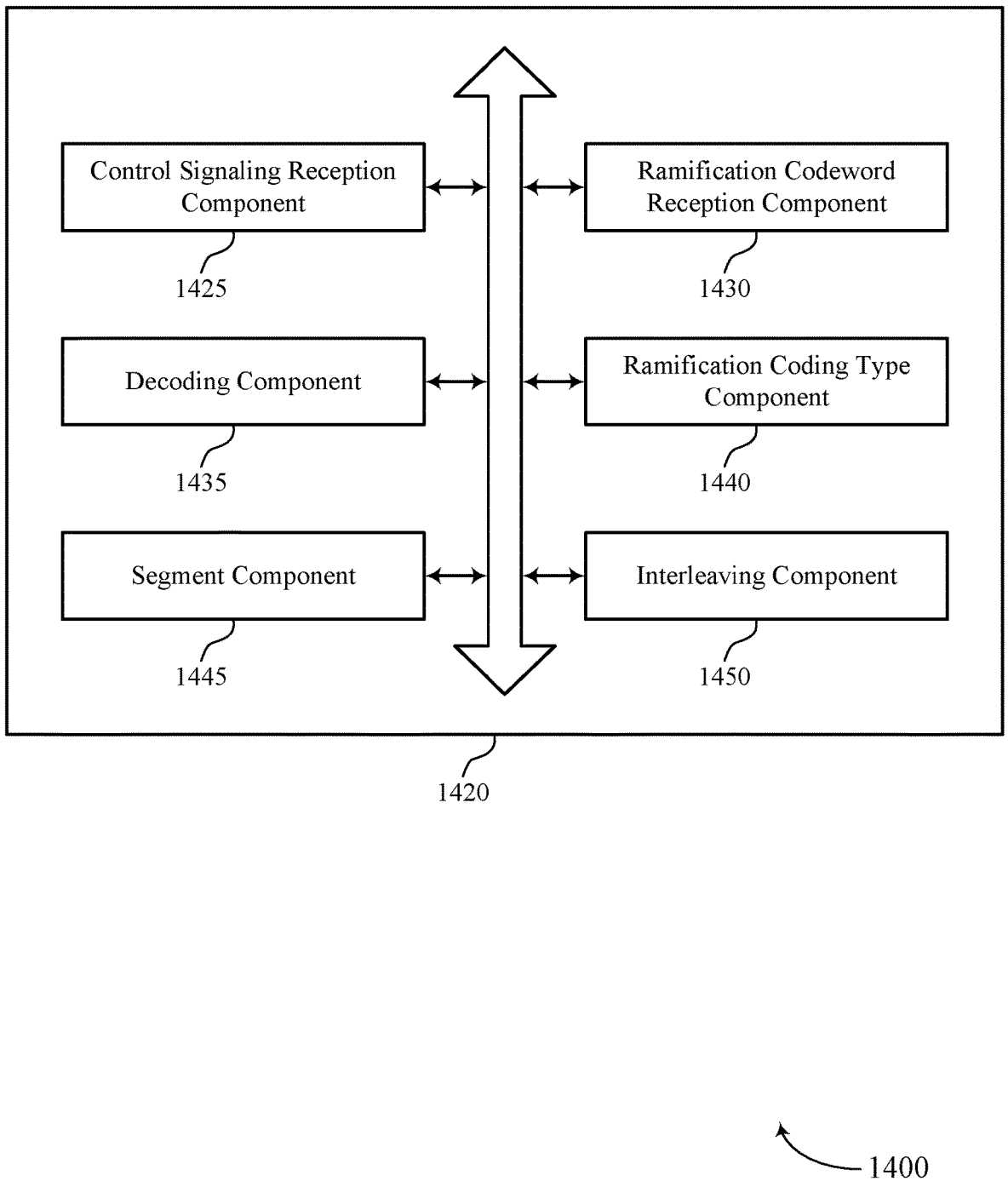
FIG. 14 shows a block diagram of a communications manager that supports learning-based dynamic signal formatting with ramification coding in accordance with aspects of the present disclosure.

FIG. 14 shows a block diagram 1400 of a communications manager 1420 that supports learning-based dynamic signal formatting with ramification coding in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of learning-based dynamic signal formatting with ramification coding as described herein. For example, the communications manager 1420 may include a control signaling reception component 1425, a ramification codeword reception component 1430, a decoding component 1435, a ramification coding type component 1440, a segment component 1445, an interleaving component 1450, or any combination thereof. Each of these components may communicate, directly or indirectly, with one another (e.g., via one or more buses).

The communications manager 1420 may support wireless communication at a first receiver in accordance with examples as disclosed herein. The control signaling reception component 1425 may be configured as or otherwise support a means for receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The ramification codeword reception component 1430 may be configured as or otherwise support a means for receiving, based on the control signaling, at least one ramification codeword in a dynamic signaling format via the common resource and the dedicated resource that is allocated to the first receiver. The decoding component 1435 may be configured as or otherwise support a means for decoding the at least one ramification codeword in the dynamic signaling format to obtain the common code segment and a first dedicated code segment for the first receiver based on the ramification coding structure.

In some examples, the control signaling indicates an ending of the common code segment of the ramification codeword and a beginning of the dedicated code segment of the ramification codeword. In some examples, the control signaling indicates a dynamic schedule based on a duration of the dynamic signaling format, a periodicity of the dynamic signaling format, or both.

In some examples, the dynamic schedule is periodic, semi-persistent, or persistent. In some examples, the control signaling indicates the ramification codeword is encoded using a first ramification coding type of a set of multiple types of ramification coding, where the ramification codeword is decoded based on the first ramification coding type.

In some examples, the first ramification coding type indicates that a beginning subset or an ending subset of bits of the ramification codeword are the common code segment. In some examples, the first ramification coding type indicates that the ramification codeword is encoded using convolution coding or polar coding.

In some examples, the ramification coding structure for the set of multiple messages is based on a quantity of hierarchical levels. In some examples, the ramification coding structure indicates a quantity of bits of the ramification codeword being used for the common code segment based at least in part on the common data in the set of multiple messages.

In some examples, the ramification coding structure indicates a quantity of bits of the ramification codeword being used for the dedicated code segment. In some examples, the control signaling schedules a transmission of a message in the common resource and the dedicated resource. In some examples, the control signaling indicates the ramification codeword concatenates the common code segment and the dedicated code segment.

In some examples, the control signaling indicates an interleaving pattern applied to interleave the common code segment and the dedicated code segment to generate the ramification codeword.

In some examples, the ramification codeword reception component 1430 may be configured as or otherwise support a means for the ramification codeword includes a control message codeword or a data message codeword.

Figure 15:
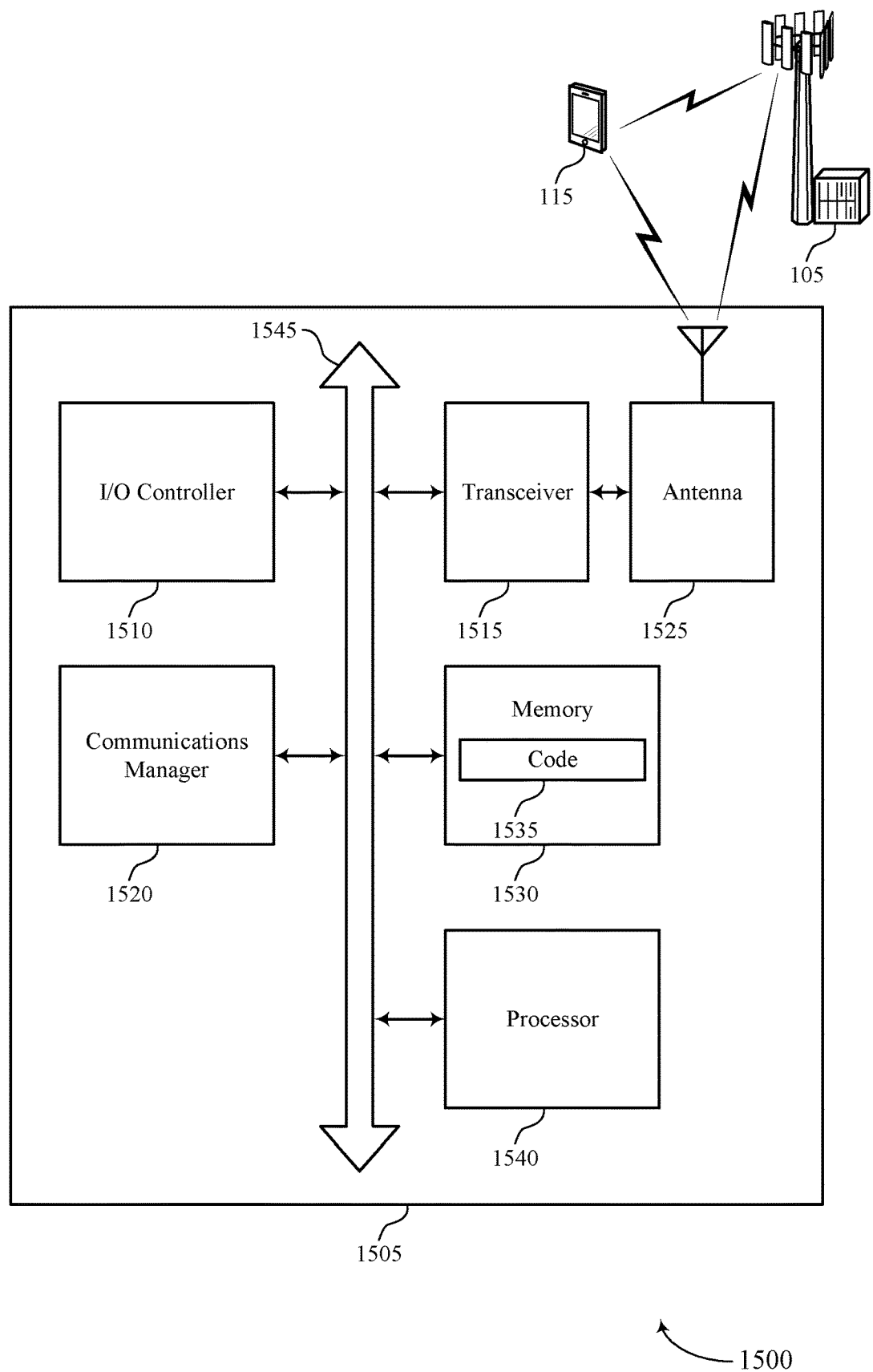
FIG. 15 shows a diagram of a system including a device that supports learning-based dynamic signal formatting with ramification coding in accordance with aspects of the present disclosure.

FIG. 15 shows a diagram of a system 1500 including a device 1505 that supports learning-based dynamic signal formatting with ramification coding in accordance with aspects of the present disclosure. The device 1505 may be an example of or include the components of a device 1205, a device 1305, or a receiver (e.g., a UE 115) as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting learning-based dynamic signal formatting with ramification coding). For example, the device 1505 or a component of the device 1505 may include a processor 1540 and memory 1530 coupled with or to the processor 1540, the processor 1540 and memory 1530 configured to perform various functions described herein.

The communications manager 1520 may support wireless communication at a first receiver in accordance with examples as disclosed herein. For example, the communications manager 1520 may be configured as or otherwise support a means for receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The communications manager 1520 may be configured as or otherwise support a means for receiving, based on the control signaling, at least one ramification codeword in a dynamic signaling format via the common resource and the dedicated resource that is allocated to the first receiver. The communications manager 1520 may be configured as or otherwise support a means for decoding the at least one ramification codeword in the dynamic signaling format to obtain the common code segment and a first dedicated code segment for the first receiver based on the ramification coding structure.

By including or configuring the communications manager 1520 in accordance with examples as described herein, the device 1505 may support techniques for learning-based dynamic signal formatting with ramification coding, which may increase resource utilization efficiency, improve communication reliability, and improve coordination between wireless devices.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of learning-based dynamic signal formatting with ramification coding as described herein, or the processor 1540 and the memory 1530 may be otherwise configured to perform or support such operations.

Figure 16:
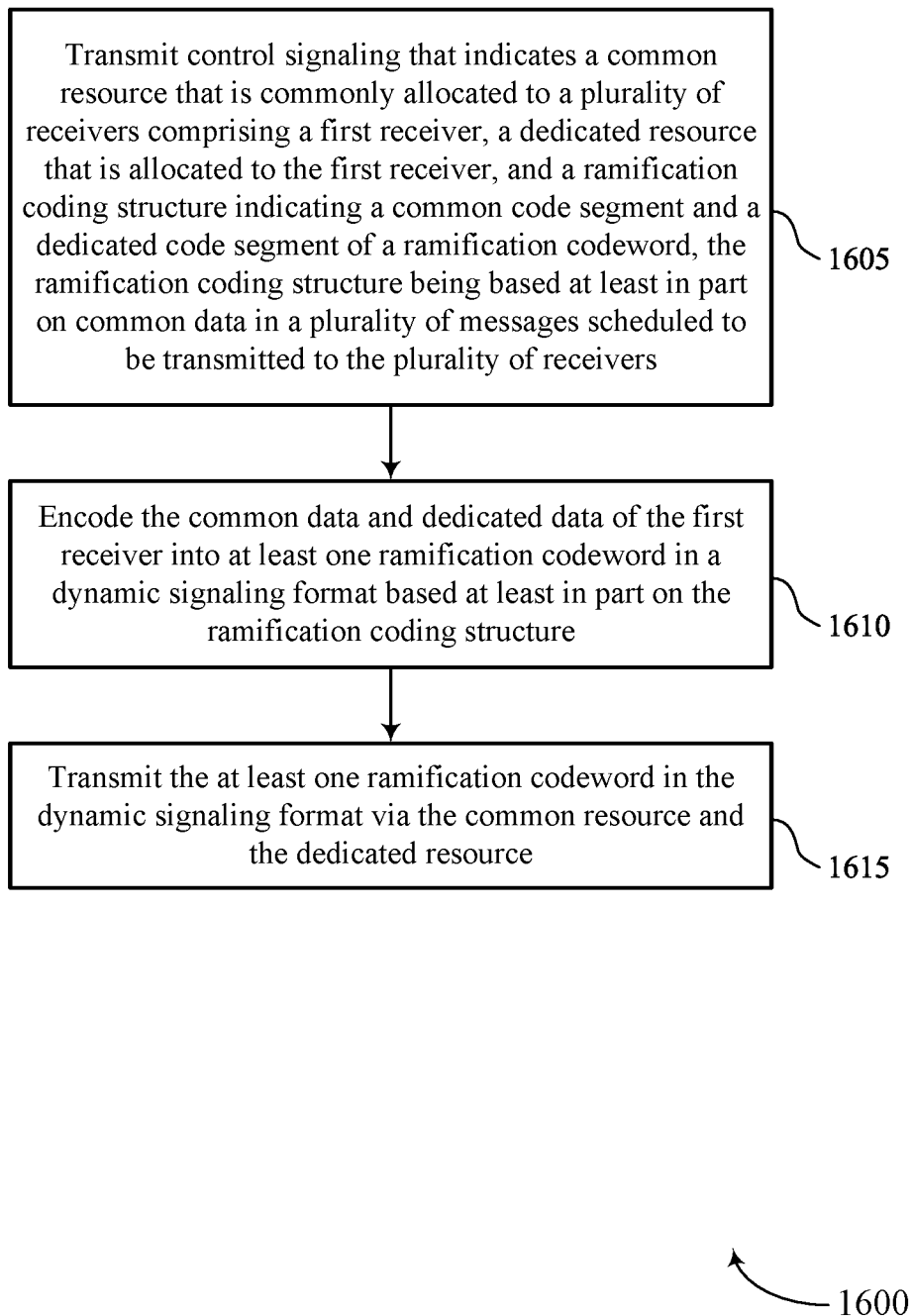
FIGS. 16 through 20 show flowcharts illustrating methods that support learning-based dynamic signal formatting with ramification coding in accordance with aspects of the present disclosure.

FIG. 16 shows a flowchart illustrating a method 1600 that supports learning-based dynamic signal formatting with ramification coding in accordance with aspects of the present disclosure. The operations of the method 1600 may be implemented by a transmitter (e.g., a base station) or its components as described herein. For example, the operations of the method 1600 may be performed by a transmitter (e.g., a base station 105) as described with reference to FIGS. 1 through 11. In some examples, a transmitter may execute a set of instructions to control the functional elements of the transmitter to perform the described functions. Additionally, or alternatively, the transmitter may perform aspects of the described functions using special-purpose hardware.

At 1605, the method may include transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The operations of 1605 may be performed in accordance with examples as disclosed herein. In some examples, aspects of the operations of 1605 may be performed by a control signaling transmission component 1025 as described with reference to FIG. 10.

At 1610, the method may include encoding the common data and dedicated data of the first receiver into at least one ramification codeword in a dynamic signaling format based on the ramification coding structure. The operations of 1610 may be performed in accordance with examples as disclosed herein. In some examples, aspects of the operations of 1610 may be performed by an encoding component 1030 as described with reference to FIG. 10.

At 1615, the method may include transmitting the at least one ramification codeword in the dynamic signaling format via the common resource and the dedicated resource. The operations of 1615 may be performed in accordance with examples as disclosed herein. In some examples, aspects of the operations of 1615 may be performed by a ramification codeword transmission component 1035 as described with reference to FIG. 10.

Figure 17:
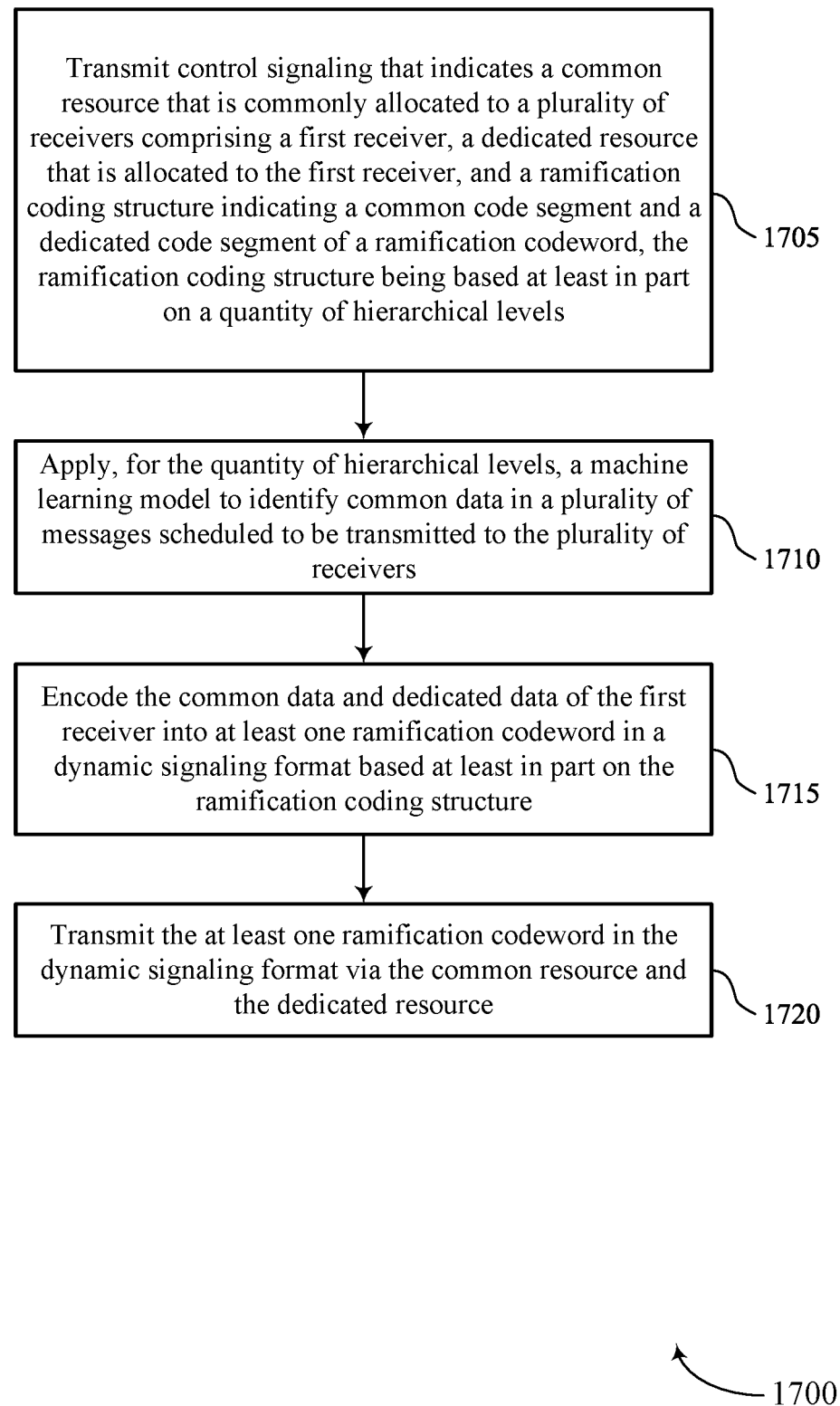

FIG. 17 shows a flowchart illustrating a method 1700 that supports learning-based dynamic signal formatting with ramification coding in accordance with aspects of the present disclosure. The operations of the method 1700 may be implemented by a transmitter (e.g., a base station) or its components as described herein. For example, the operations of the method 1700 may be performed by a transmitter (e.g., a base station 105) as described with reference to FIGS. 1 through 11. In some examples, a transmitter may execute a set of instructions to control the functional elements of the transmitter to perform the described functions. Additionally, or alternatively, the transmitter may perform aspects of the described functions using special-purpose hardware.

At 1705, the method may include transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on a quantity of hierarchical levels. The operations of 1705 may be performed in accordance with examples as disclosed herein. In some examples, aspects of the operations of 1705 may be performed by a control signaling transmission component 1025 as described with reference to FIG. 10.

At 1710, the method may include applying, for the quantity of hierarchical levels, a machine learning model to identify common data in a set of multiple messages scheduled to be transmitted to the set of multiple receivers. The operations of 1710 may be performed in accordance with examples as disclosed herein. In some examples, aspects of the operations of 1710 may be performed by a machine learning component 1040 as described with reference to FIG. 10.

At 1715, the method may include encoding the common data and dedicated data of the first receiver into at least one ramification codeword in a dynamic signaling format based on the ramification coding structure. The operations of 1715 may be performed in accordance with examples as disclosed herein. In some examples, aspects of the operations of 1715 may be performed by an encoding component 1030 as described with reference to FIG. 10.

At 1720, the method may include transmitting the at least one ramification codeword in the dynamic signaling format via the common resource and the dedicated resource. The operations of 1720 may be performed in accordance with examples as disclosed herein. In some examples, aspects of the operations of 1720 may be performed by a ramification codeword transmission component 1035 as described with reference to FIG. 10.

Figure 18:
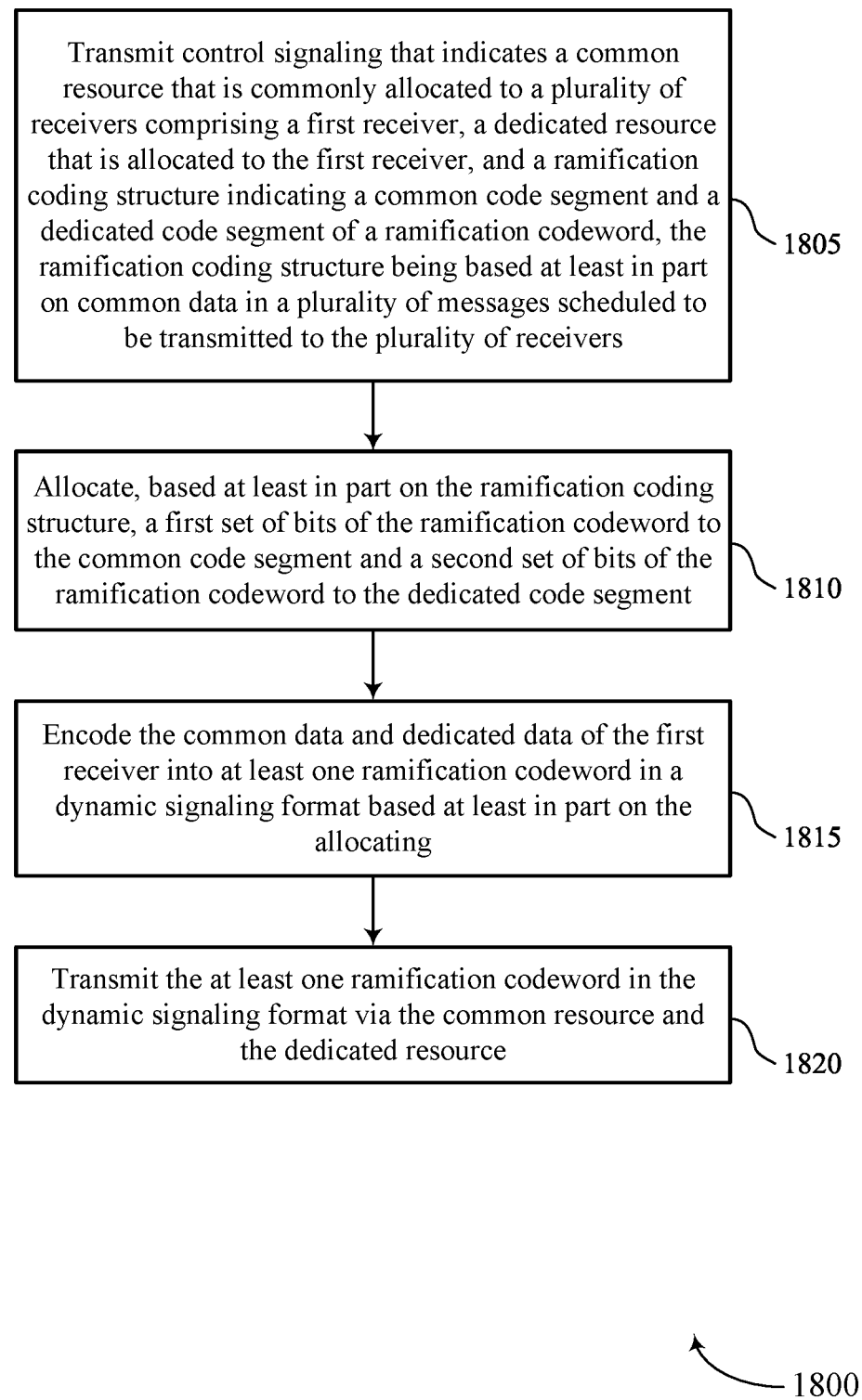

FIG. 18 shows a flowchart illustrating a method 1800 that supports learning-based dynamic signal formatting with ramification coding in accordance with aspects of the present disclosure. The operations of the method 1800 may be implemented by a transmitter (e.g., a base station) or its components as described herein. For example, the operations of the method 1800 may be performed by a transmitter (e.g., a base station 105) as described with reference to FIGS. 1 through 11. In some examples, a transmitter may execute a set of instructions to control the functional elements of the transmitter to perform the described functions. Additionally, or alternatively, the transmitter may perform aspects of the described functions using special-purpose hardware.

At 1805, the method may include transmitting control signaling that indicates a common resource that is commonly allocated to a set of multiple receivers including a first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The operations of 1805 may be performed in accordance with examples as disclosed herein. In some examples, aspects of the operations of 1805 may be performed by a control signaling transmission component 1025 as described with reference to FIG. 10.

At 1810, the method may include allocating, based on the ramification coding structure, a first set of bits of the ramification codeword to the common code segment and a second set of bits of the ramification codeword to the dedicated code segment. The operations of 1810 may be performed in accordance with examples as disclosed herein. In some examples, aspects of the operations of 1810 may be performed by a bit allocation component 1045 as described with reference to FIG. 10.

At 1815, the method may include encoding the common data and dedicated data of the first receiver into at least one ramification codeword in a dynamic signaling format based on the allocating. The operations of 1815 may be performed in accordance with examples as disclosed herein. In some examples, aspects of the operations of 1815 may be performed by an encoding component 1030 as described with reference to FIG. 10.

At 1820, the method may include transmitting the at least one ramification codeword in the dynamic signaling format via the common resource and the dedicated resource. The operations of 1820 may be performed in accordance with examples as disclosed herein. In some examples, aspects of the operations of 1820 may be performed by a ramification codeword transmission component 1035 as described with reference to FIG. 10.

Figure 19:
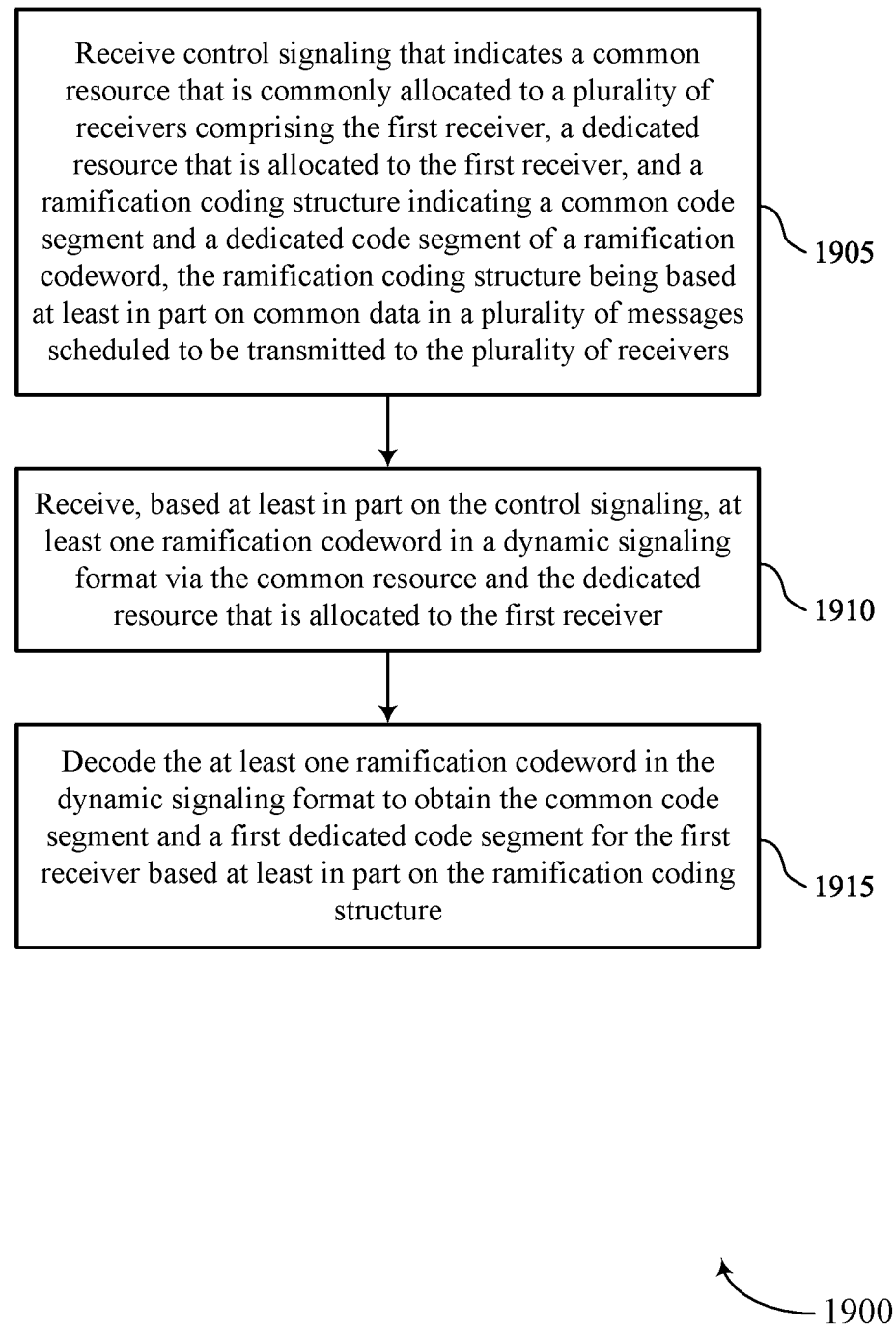

FIG. 19 shows a flowchart illustrating a method 1900 that supports learning-based dynamic signal formatting with ramification coding in accordance with aspects of the present disclosure. The operations of the method 1900 may be implemented by a receiver (e.g., a UE) or its components as described herein. For example, the operations of the method 1900 may be performed by a receiver (e.g., a UE 115) as described with reference to FIGS. 1 through 7 and 12 through 15. In some examples, a receiver may execute a set of instructions to control the functional elements of the receiver to perform the described functions. Additionally, or alternatively, the receiver may perform aspects of the described functions using special-purpose hardware.

At 1905, the method may include receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The operations of 1905 may be performed in accordance with examples as disclosed herein. In some examples, aspects of the operations of 1905 may be performed by a control signaling reception component 1425 as described with reference to FIG. 14.

At 1910, the method may include receiving, based on the control signaling, at least one ramification codeword in a dynamic signaling format via the common resource and the dedicated resource that is allocated to the first receiver. The operations of 1910 may be performed in accordance with examples as disclosed herein. In some examples, aspects of the operations of 1910 may be performed by a ramification codeword reception component 1430 as described with reference to FIG. 14.

At 1915, the method may include decoding the at least one ramification codeword in the dynamic signaling format to obtain the common code segment and a first dedicated code segment for the first receiver based on the ramification coding structure. The operations of 1915 may be performed in accordance with examples as disclosed herein. In some examples, aspects of the operations of 1915 may be performed by a decoding component 1435 as described with reference to FIG. 14.

Figure 20:
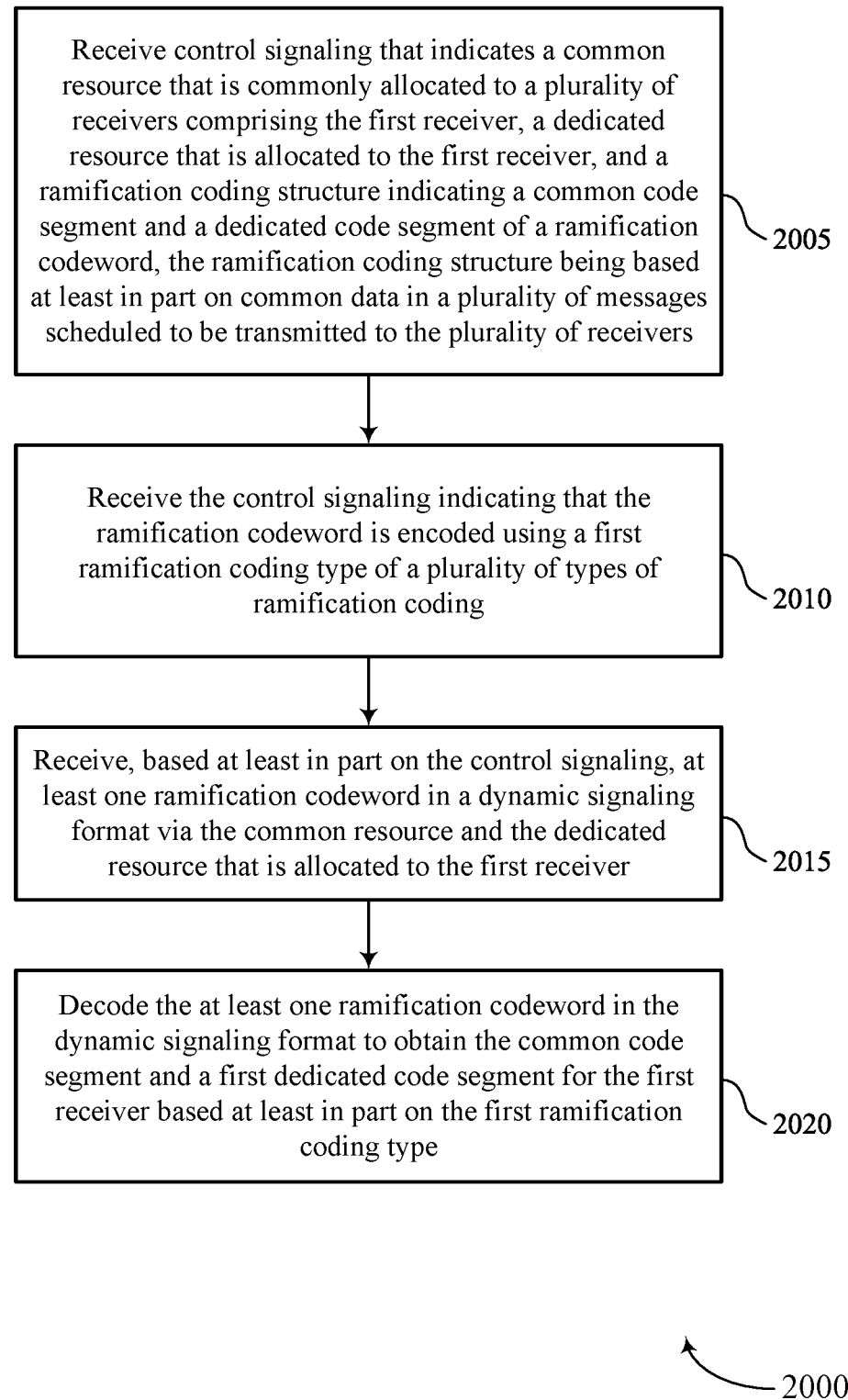

FIG. 20 shows a flowchart illustrating a method 2000 that supports learning-based dynamic signal formatting with ramification coding in accordance with aspects of the present disclosure. The operations of the method 2000 may be implemented by a receiver (e.g., a UE) or its components as described herein. For example, the operations of the method 2000 may be performed by a receiver (e.g., a UE 115) as described with reference to FIGS. 1 through 7 and 12 through 15. In some examples, a receiver may execute a set of instructions to control the functional elements of the receiver to perform the described functions. Additionally, or alternatively, the receiver may perform aspects of the described functions using special-purpose hardware.

At 2005, the method may include receiving control signaling that indicates a common resource that is commonly allocated to a set of multiple receivers including the first receiver, a dedicated resource that is allocated to the first receiver, and a ramification coding structure indicating a common code segment and a dedicated code segment of a ramification codeword, the ramification coding structure being based on common data in a set of multiple messages scheduled to be transmitted to the set of multiple receivers. The operations of 2005 may be performed in accordance with examples as disclosed herein. In some examples, aspects of the operations of 2005 may be performed by a control signaling reception component 1425 as described with reference to FIG. 14.

At 2010, the method may include receiving the control signaling that indicates the ramification codeword is encoded using a first ramification coding type of a set of multiple types of ramification coding, where the ramification codeword is decoded based on the first ramification coding type. The operations of 2010 may be performed in accordance with examples as disclosed herein. In some examples, aspects of the operations of 2010 may be performed by a ramification coding type component 1440 as described with reference to FIG. 14.

At 2015, the method may include receiving, based on the control signaling, at least one ramification codeword in a dynamic signaling format via the common resource and the dedicated resource that is allocated to the first receiver. The operations of 2015 may be performed in accordance with examples as disclosed herein. In some examples, aspects of the operations of 2015 may be performed by a ramification codeword reception component 1430 as described with reference to FIG. 14.

At 2020, the method may include decoding the at least one ramification codeword in the dynamic signaling format to obtain the common code segment and a first dedicated code segment for the first receiver based on the first ramification coding type. The operations of 2020 may be performed in accordance with examples as disclosed herein. In some examples, aspects of the operations of 2020 may be performed by a decoding component 1435 as described with reference to FIG. 14.

The following provides an overview of aspects of the present disclosure:

Aspect 1: A method for wireless communication at a first transmitter, comprising: transmitting control signaling that indicates a common resource that is commonly allocated to a plurality of receivers comprising a first receiver, a dedicated resource that is allocated to the first receiver, and a ramification coding structure indicating a common code segment and a dedicated code segment of a ramification codeword, the ramification coding structure being based at least in part on common data in a plurality of messages scheduled to be transmitted to the plurality of receivers; encoding the common data and dedicated data of the first receiver into at least one ramification codeword in a dynamic signaling format based at least in part on the ramification coding structure; and transmitting the at least one ramification codeword in the dynamic signaling format via the common resource and the dedicated resource.

Aspect 2: The method of aspect 1, wherein the ramification coding structure for the plurality of messages is based at least in part on a quantity of hierarchical levels.

Aspect 3: The method of aspect 2, further comprising: applying, for the quantity of hierarchical levels, a machine learning model to identify the common data in the plurality of messages.

Aspect 4: The method of aspect 3, wherein applying the machine learning model further comprises: applying, using a set of one or more parameters, the machine learning model to allocate a first set of bits of the ramification codeword to the common code segment and a second set of bits of the ramification codeword to the dedicated code segment; and wherein the set of one or more parameters comprises at least one of an aggregated user activity parameter associated with the plurality of receivers, a user signal format parameter associated with the plurality of receivers, or a cell loading parameter associated with the plurality of receivers.

Aspect 5: The method of any of aspects 3 through 4, wherein the machine learning model comprises a GNN model.

Aspect 6: The method of any of aspects 1 through 5, further comprising: allocating, based at least in part on the ramification coding structure, a first set of bits of the ramification codeword to the common code segment and a second set of bits of the ramification codeword to the dedicated code segment, wherein encoding the ramification codeword is based at least in part on the allocating.

Aspect 7: The method of any of aspects 1 through 6, wherein the ramification coding structure indicates a quantity of bits to be used for the common code segment of the ramification codeword based at least in part on the common data in the plurality of messages.

Aspect 8: The method of any of aspects 1 through 7, wherein the control signaling indicates an ending of the common code segment of the ramification codeword and a beginning of the dedicated code segment of the ramification codeword.

Aspect 9: The method of any of aspects 1 through 8, wherein the control signaling indicates a dynamic schedule based at least in part on a duration of the dynamic signaling format, a periodicity of the dynamic signaling format, or both.

Aspect 10: The method of aspect 9, wherein the dynamic schedule is periodic, semi-persistent, or persistent.

Aspect 11: The method of any of aspects 1 through 10, wherein the control signaling indicates the ramification codeword is encoded using a first ramification coding type of a plurality of types of ramification coding, wherein the ramification codeword is decoded based at least in part on the first ramification coding type.

Aspect 12: The method of aspect 11, wherein the first ramification coding type indicates that a beginning subset or an ending subset of bits of the ramification codeword are the common code segment.

Aspect 13: The method of any of aspects 11 through 12, wherein the first ramification coding type indicates that the ramification codeword is encoded using convolution coding or polar coding.

Aspect 14: The method of any of aspects 1 through 13, wherein the control signaling schedules a transmission of a message in the common resource and the dedicated resource.

Aspect 15: The method of any of aspects 1 through 14, wherein the control signaling indicates the ramification codeword concatenates the common code segment and the dedicated code segment.

Aspect 16: The method of any of aspects 1 through 15, wherein the control signaling indicates an interleaving pattern applied to interleave the common code segment and the dedicated code segment to generate the ramification codeword.

Aspect 17: The method of any of aspects 1 through 16, wherein the ramification codeword comprises a control message codeword or a data message codeword.

Aspect 18: A method for wireless communication at a first receiver, comprising: receiving control signaling that indicates a common resource that is commonly allocated to a plurality of receivers comprising the first receiver, a dedicated resource that is allocated to the first receiver, and a ramification coding structure indicating a common code segment and a dedicated code segment of a ramification codeword, the ramification coding structure being based at least in part on common data in a plurality of messages scheduled to be transmitted to the plurality of receivers; receiving, based at least in part on the control signaling, at least one ramification codeword in a dynamic signaling format via the common resource and the dedicated resource that is allocated to the first receiver; and decoding the at least one ramification codeword in the dynamic signaling format to obtain the common code segment and a first dedicated code segment for the first receiver based at least in part on the ramification coding structure.

Aspect 19: The method of aspect 18, wherein the control signaling indicates an ending of the common code segment of the ramification codeword and a beginning of the dedicated code segment of the ramification codeword.

Aspect 20: The method of any of aspects 18 through 19, wherein the control signaling indicates a dynamic schedule based at least in part on a duration of the dynamic signaling format, a periodicity of the dynamic signaling format, or both.

Aspect 21: The method of aspect 20, wherein the dynamic schedule is periodic, semi-persistent, or persistent.

Aspect 22: The method of any of aspects 18 through 21, wherein the control signaling indicates the ramification codeword is encoded using a first ramification coding type of a plurality of types of ramification coding, wherein the ramification codeword is decoded based at least in part on the first ramification coding type.

Aspect 23: The method of aspect 22, wherein the first ramification coding type indicates that a beginning subset or an ending subset of bits of the ramification codeword are the common code segment.

Aspect 24: The method of any of aspects 22 through 23, wherein the first ramification coding type indicates that the ramification codeword is encoded using convolution coding or polar coding.

Aspect 25: The method of any of aspects 18 through 24, wherein the ramification coding structure for the plurality of messages is based at least in part on a quantity of hierarchical levels.

Aspect 26: The method of any of aspects 18 through 25, wherein the ramification coding structure indicates a quantity of bits of the ramification codeword being used for the common code segment based at least in part on the common data in the plurality of messages.

Aspect 27: The method of any of aspects 18 through 26, wherein the ramification coding structure indicates a quantity of bits of the ramification codeword being used for the dedicated code segment.

Aspect 28: The method of any of aspects 18 through 27, wherein the control signaling schedules a transmission of a message in the common resource and the dedicated resource.

Aspect 29: The method of any of aspects 18 through 28, wherein the control signaling indicates the ramification codeword concatenates the common code segment and the dedicated code segment.

Aspect 30: The method of any of aspects 18 through 29, wherein the control signaling indicates an interleaving pattern applied to interleave the common code segment and the dedicated code segment to generate the ramification codeword.

Aspect 31: The method of any of aspects 18 through 30, further comprising: the ramification codeword comprises a control message codeword or a data message codeword.

Aspect 32: An apparatus for wireless communication at a first transmitter, comprising a processor; memory coupled with the processor; and instructions stored in the memory and executable by the processor to cause the apparatus to perform a method of any of aspects 1 through 17.

Aspect 33: An apparatus for wireless communication at a first transmitter, comprising at least one means for performing a method of any of aspects 1 through 17.

Aspect 34: A non-transitory computer-readable medium storing code for wireless communication at a first transmitter, the code comprising instructions executable by a processor to perform a method of any of aspects 1 through 17.

Aspect 35: An apparatus for wireless communication at a first receiver, comprising a processor; memory coupled with the processor; and instructions stored in the memory and executable by the processor to cause the apparatus to perform a method of any of aspects 18 through 31.

Aspect 36: An apparatus for wireless communication at a first receiver, comprising at least one means for performing a method of any of aspects 18 through 31.

Aspect 37: A non-transitory computer-readable medium storing code for wireless communication at a first receiver, the code comprising instructions executable by a processor to perform a method of any of aspects 18 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first transmitter, comprising:
   one or more processors;
   one or more memories coupled with the one or more processors; and
   instructions stored in the one or more memories and executable by the one or more processors to cause the apparatus to:
   transmit control signaling that indicates:
      a common resource that is commonly allocated to a plurality of receivers comprising a first receiver,
      a dedicated resource that is allocated to the first receiver,
      a ramification coding structure indicating a common code segment and a dedicated code segment of a ramification codeword,
         the ramification coding structure being based at least in part on common data in a plurality of messages scheduled to be transmitted to the plurality of receivers, and
   wherein the control signaling indicates at least one of:
      an ending of the common code segment of the ramification codeword and a beginning of the dedicated code segment of the ramification codeword, or
      a dynamic schedule based at least in part on a duration of a dynamic signaling format, a periodicity of the dynamic signaling format, or both;
   encode the common data and dedicated data of the first receiver into at least one ramification codeword in the dynamic signaling format based at least in part on the ramification coding structure; and
   transmit the at least one ramification codeword in the dynamic signaling format via the common resource and the dedicated resource.

2. The apparatus of claim 1, wherein the ramification coding structure for the plurality of messages is based at least in part on a quantity of hierarchical levels.

3. The apparatus of claim 2, wherein the instructions are further executable by the one or more processors to cause the apparatus to:
   apply, for the quantity of hierarchical levels, a machine learning model to identify the common data in the plurality of messages.

4. The apparatus of claim 3, wherein the instructions to apply the machine learning model are further executable by the one or more processors to cause the apparatus to:
   apply, using a set of one or more parameters, the machine learning model to allocate a first set of bits of the ramification codeword to the common code segment and a second set of bits of the ramification codeword to the dedicated code segment; and
   wherein the set of one or more parameters comprise at least one of an aggregated user activity parameter associated with the plurality of receivers, a user signal format parameter associated with the plurality of receivers, or a cell loading parameter associated with the plurality of receivers.

5. The apparatus of claim 3, wherein the machine learning model comprises a graph neural network model.

6. The apparatus of claim 1, wherein the instructions are further executable by the one or more processors to cause the apparatus to:
- allocate, based at least in part on the ramification coding structure, a first set of bits of the ramification codeword to the common code segment and a second set of bits of the ramification codeword to the dedicated code segment,
- wherein encoding the ramification codeword is based at least in part on the allocating.

7. The apparatus of claim 1, wherein the ramification coding structure indicates a quantity of bits to be used for the common code segment of the ramification codeword based at least in part on the common data in the plurality of messages.

8. The apparatus of claim 1, wherein the control signaling indicates the ending of the common code segment of the ramification codeword and the beginning of the dedicated code segment of the ramification codeword.

9. The apparatus of claim 1, wherein the control signaling indicates the dynamic schedule based at least in part on the duration of the dynamic signaling format, the periodicity of the dynamic signaling format, or both.

10. The apparatus of claim 9, wherein the dynamic schedule is periodic, semi-persistent, or persistent.

11. The apparatus of claim 1, wherein the control signaling indicates the ramification codeword is encoded using a first ramification coding type of a plurality of types of ramification coding,
- wherein the ramification codeword is decoded based at least in part on the first ramification coding type.

12. The apparatus of claim 11, wherein the first ramification coding type indicates that a beginning subset or an ending subset of bits of the ramification codeword are the common code segment.

13. The apparatus of claim 11, wherein the first ramification coding type indicates that the ramification codeword is encoded using convolution coding or polar coding.

14. The apparatus of claim 1, wherein the control signaling schedules a transmission of a message in the common resource and the dedicated resource.

15. The apparatus of claim 1, wherein the control signaling indicates the ramification codeword concatenates the common code segment and the dedicated code segment.

16. The apparatus of claim 1, wherein the control signaling indicates an interleaving pattern applied to interleave the common code segment and the dedicated code segment to generate the ramification codeword.

17. The apparatus of claim 1, wherein the ramification codeword comprises a control message codeword or a data message codeword.

18. An apparatus for wireless communication at a first receiver, comprising:
- one or more processors;
- one or more memories coupled with the one or more processors; and
- instructions stored in the one or more memories and executable by the one or more processors to cause the apparatus to:
  - receive control signaling that indicates:
    - a common resource that is commonly allocated to a plurality of receivers comprising the first receiver,
    - a dedicated resource that is allocated to the first receiver,
    - a ramification coding structure indicating a common code segment and a dedicated code segment of a ramification codeword,
    - the ramification coding structure being based at least in part on common data in a plurality of messages scheduled to be transmitted to the plurality of receivers, and
  - wherein the control signaling indicates at least one of:
    - an ending of the common code segment of the ramification codeword and a beginning of the dedicated code segment of the ramification codeword, or
    - a dynamic schedule based at least in part on a duration of a dynamic signaling format, a periodicity of the dynamic signaling format, or both;
  - receive, based at least in part on the control signaling, at least one ramification codeword in the dynamic signaling format via the common resource and the dedicated resource that is allocated to the first receiver; and
  - decode the at least one ramification codeword in the dynamic signaling format to obtain the common code segment and a first dedicated code segment for the first receiver based at least in part on the ramification coding structure.

19. The apparatus of claim 18, wherein the control signaling indicates the ending of the common code segment of the ramification codeword and the beginning of the dedicated code segment of the ramification codeword.

20. The apparatus of claim 18, wherein the control signaling indicates the dynamic schedule based at least in part on the duration of the dynamic signaling format, the periodicity of the dynamic signaling format, or both.

21. The apparatus of claim 20, wherein the dynamic schedule is periodic, semi-persistent, or persistent.

22. The apparatus of claim 18, wherein the control signaling indicates the ramification codeword is encoded using a first ramification coding type of a plurality of types of ramification coding,
- wherein the ramification codeword is decoded based at least in part on the first ramification coding type.

23. The apparatus of claim 22, wherein the first ramification coding type indicates that a beginning subset or an ending subset of bits of the ramification codeword are the common code segment.

24. The apparatus of claim 22, wherein the first ramification coding type indicates that the ramification codeword is encoded using convolution coding or polar coding.

25. The apparatus of claim 18, wherein the ramification coding structure for the plurality of messages is based at least in part on a quantity of hierarchical levels.

26. The apparatus of claim 18, wherein the ramification coding structure indicates a quantity of bits of the ramification codeword being used for the common code segment based at least in part on the common data in the plurality of messages.

27. The apparatus of claim 18, wherein the ramification coding structure indicates a quantity of bits of the ramification codeword being used for the dedicated code segment.

28. The apparatus of claim 18, wherein the control signaling schedules a transmission of a message in the common resource and the dedicated resource.

29. A method for wireless communication at a first transmitter, comprising:
- transmitting control signaling that indicates:
  - a common resource that is commonly allocated to a plurality of receivers comprising a first receiver,
  - a dedicated resource that is allocated to the first receiver, and a ramification coding structure indicating a common code segment and a dedicated code segment of a ramification codeword,
  the ramification coding structure being based at least in part on common data in a plurality of messages scheduled to be transmitted to the plurality of receivers;
encoding the common data and dedicated data of the first receiver into at least one ramification codeword in a dynamic signaling format based at least in part on the ramification coding structure; and
transmitting the at least one ramification codeword in the dynamic signaling format via the common resource and the dedicated resource,
wherein the control signaling indicates the ramification codeword is encoded using a first ramification coding type of a plurality of types of ramification coding, and wherein at least one of:
  the first ramification coding type indicates that a beginning subset or an ending subset of bits of the ramification codeword are the common code segment, or
  the first ramification coding type indicates that the ramification codeword is encoded using convolution coding or polar coding.

30. A method for wireless communication at a first receiver, comprising:
receiving control signaling that indicates:
  a common resource that is commonly allocated to a plurality of receivers comprising the first receiver,
  a dedicated resource that is allocated to the first receiver, and
  a ramification coding structure indicating a common code segment and a dedicated code segment of a ramification codeword,
    the ramification coding structure being based at least in part on common data in a plurality of messages scheduled to be transmitted to the plurality of receivers;
receiving, based at least in part on the control signaling, at least one ramification codeword in a dynamic signaling format via the common resource and the dedicated resource that is allocated to the first receiver; and
decoding the at least one ramification codeword in the dynamic signaling format to obtain the common code segment and a first dedicated code segment for the first receiver based at least in part on the ramification coding structure,
wherein the control signaling indicates the ramification codeword is encoded using a first ramification coding type of a plurality of types of ramification coding,
wherein the ramification codeword is decoded based at least in part on the first ramification coding type, and wherein at least one of:
  the first ramification coding type indicates that a beginning subset or an ending subset of bits of the ramification codeword are the common code segment, or
  the first ramification coding type indicates that the ramification codeword is encoded using convolution coding or polar coding.

* * * * *